United States Patent
Monobe et al.

(10) Patent No.: US 7,292,733 B2
(45) Date of Patent: Nov. 6, 2007

(54) IMAGE PROCESSING APPARATUS AND IMAGE PROCESSING METHOD

(75) Inventors: Yusuke Monobe, Kadoma (JP); Tatsumi Watanabe, Moriguchi (JP); Yasuhiro Kuwahara, Osaka (JP); Akio Kojima, Neyagawa (JP); Toshiharu Kurosawa, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 818 days.

(21) Appl. No.: 10/682,978

(22) Filed: Oct. 14, 2003

(65) Prior Publication Data

US 2004/0081366 A1 Apr. 29, 2004

(30) Foreign Application Priority Data

Oct. 16, 2002 (JP) ............................. 2002-301602

(51) Int. Cl.
*G06K 9/40* (2006.01)
(52) U.S. Cl. ...................................... 382/261
(58) Field of Classification Search ................ 382/243, 382/261, 266, 275, 199; 358/3.27; 348/246
See application file for complete search history.

(56) References Cited

U.S. PATENT DOCUMENTS 4,783,840 A * 11/1988 Song ........................ 382/261
5,748,788 A * 5/1998 Moro ........................ 382/243
5,802,218 A * 9/1998 Brailean .................... 382/275
7,006,255 B2 * 2/2006 Sun et al. .................. 358/3.27

FOREIGN PATENT DOCUMENTS

JP 3011828 12/1999

OTHER PUBLICATIONS

S.M. Smith and J.M. Brady, entitled "*SUSAN-A New Approach to Low Level Image Processing*", Int. J.Comp. Vision, vol. 23, No. 1, pp. 45-78, 1997.

* cited by examiner

*Primary Examiner*—Jingge Wu
*Assistant Examiner*—Jayesh A Patel
(74) *Attorney, Agent, or Firm*—Wenderoth, Lind & Ponack, L.L.P.

(57) ABSTRACT

An image processing apparatus for performing filter processing on a decoded image that is obtained by decoding compressed data obtained by coding a multi-valued image by the block of M×N pixels so as to eliminate noises and generating a reconstructed image. The image processing apparatus includes: a differential value calculation unit operable to calculate a differential value between a pixel value of a current pixel and each one of pixel values of peripheral pixels in a filter processing area that is predetermined for each pixel that forms the decoded image, a distribution coefficient calculation unit operable to calculate distribution coefficients as to the pixel values of the pixels, a filter coefficient calculation unit operable to calculate the filter coefficients as to the peripheral pixels based on the differential values calculated by the differential value calculation unit and the distribution coefficients calculated by the distribution coefficient calculation unit, a filter processing unit operable to perform filter processing as to the pixel value of the current pixel in the decoded image using the filter coefficient that is calculated by the filter coefficient calculation unit and calculate the pixel value of the current pixel in the reconstructed image.

13 Claims, 20 Drawing Sheets

Fig. 18A

| -1 | 0 | 1 |
|---|---|---|
| -2 | 0 | 2 |
| -1 | 0 | 1 |

Fig. 18B

| -1 | -2 | -1 |
|---|---|---|
| 0 | 0 | 0 |
| 1 | 2 | 1 |

IMAGE PROCESSING APPARATUS AND IMAGE PROCESSING METHOD

BACKGROUND OF THE INVENTION (1) Field of the Invention

The present invention relates to an image processing apparatus and an image processing method for generating a reconstructed image where mosquito noises that occurred as a result of block coding are effectively eliminated without blurring the edges and textures in an image by performing filter processing on the decoded image.

(2) Description of the Related Art

It is becoming popular to take an image (still image) such as a scenic shot or a people photograph using a digital still camera that has become widespread in recent years. However, the data amount of a digitized image is huge. Storing the image with huge data amount on a storage medium such as an IC memory as it is or transmitting it using a transmission medium such as the Internet or LAN causes the result that only a few images can be barely stored on a storage medium or the transmission time in a transmission medium becomes longer. Therefore, image compression technique is necessary in handling images.

When there is a need to compress image data at a high ratio, an irreversible compression method where the decoded image does not completely match the original image is generally used. Most irreversible compression methods employ a coding method of dividing an image data into blocks of M×N pixels, performing an orthogonal transform on the respective blocks, and then quantizing the orthogonal transform coefficient. One of these representative methods is JPEG that is widespread as a color still image compression method.

FIG. 1 is a block diagram showing the functional structure of the JPEG coding apparatus and the JPEG decoding apparatus. The coding apparatus 60 compresses the original image into the JPEG-compressed data, and it comprises a pre-processing unit 61, a DCT (discrete cosine transform) transformation unit 62, a quantization unit 63, a quantization table 64, and an entropy coding unit 65 as shown in FIG. 1. The decoding apparatus 70 decompresses the JPEG-compressed data to a decoded image, and it comprises an entropy decoding unit 71, a dequantization unit 72, a dequantization table 73, an IDCT (inverse discrete cosine transform) transformation unit 74, and a post-processing unit 75 as shown in FIG. 1.

When the JPEG coding processing is performed in the coding apparatus 60, the pre-processing unit 61 transforms each pixel data made of multi-valued data of R (Red), G (Green) and B (Blue) of the original image into data of Y (luminance component) and Cr and Cb (color difference components) first.

Next, the DCT transformation unit 62 performs the DCT on each 8×8 pixel block of YCbCr data, and calculates the DCT coefficient.

Next, the quantization unit 63 performs quantization of the DCT coefficient. Each component of the DCT coefficients is quantized using a different step width according to the quantization table 64 at this time.

Lastly, the entropy coding unit 65 performs coding of the quantized DCT coefficient and generates the JPEG-compressed data. The JPEG standard method employs the Huffman coding as an entropy coding.

The above-mentioned processing is the outline of the coding processing from image data to the JPEG-compressed data. The JPEG-compressed data generated in this way is delivered to the decoding apparatus 70 via a storage medium (such as an SD card) or a transmission medium.

Next, processes of the decoding processing from the JPEG-compressed data to a decoded image will be explained.

When the JPEG decoding processing is performed in the decoding apparatus 70, the entropy decoding unit 71 performs entropy decoding on the JPEG-compressed data first.

Next, the dequantization unit 72 performs dequantization. At that time, the dequantization unit 72 reads out the information on the quantization table 64 used at the time of coding from the JPEG-compressed data and uses it as the dequantization table 73.

Next, the IDCT transformation unit 74 performs the IDCT and transforms the DCT coefficient into a decoded image of YCbCr data.

Lastly, the post-processing unit 75 obtains a decoded image by performing a transformation processing from the YCbCr data to RGB data.

The above-mentioned processing is the outline of the coding processing and the decoding processing concerning the JPEG.

As mentioned above, quantization of the DCT coefficient is included in the process of the JPEG coding processing. Therefore, data degradation is caused by the quantization errors. As a result of this, this degradation appears as noises on a decoded image when reproducing the decoded image on a paper using a printer or the like as it is. Even small noises on a still image can be obtrusive because still images can be viewed for a longer time, and these noises are also obtrusive in the case of moving image compression for performing block coding.

There is a kind of noise that exerts bad visual influence on a decoded image. This kind of noise is called mosquito noise. Mosquito noise means fuzzy dots that occur around the edges of decoded images. This results from the incapability of reproducing strong edges which existed on the original image to be reproduced accurately because a lot of high-frequency components are lost by quantization of the DCT coefficient.

In order to eliminate this kind of noise, a filtering processing is performed on the decoded image, and the image processing apparatus 100 for generating a reconstructed image where mosquito noises are eliminated has been conventionally considered as shown in FIG. 2. A lot of filter processing is proposed as a filter processing method, and the SUSAN filter shown in formula (1) is one of the new filters capable of keeping edges sharp and eliminating noises (for example, refer to the non-patent literature 1). Note that this technique is also called "the first prior art" from here.

$$g(x,y) = \frac{\sum_{i,j} \{f(x+i, y+j) \cdot \alpha_{x,y}(i,j)\}}{\sum_{i,j} \{\alpha_{x,y}(i,j)\}} \quad (1)$$

where $$\alpha_{x,y}(i,j) = \alpha 1_{x,y}(i,j) \cdot \alpha 2_{x,y}(i,j) \quad (2)$$

$$\alpha 1_{x,y}(i,j) = \exp[-(i^2+j^2)/(2\sigma^2)] \quad (3)$$

$$\alpha 2_{x,y}(i,j) = \exp[-\{f(x+i,y+j)-f(x,y)\}^2/t^2] \quad (4)$$

Here, in the formulas (1)–(4), (x, y) shows the position of the current pixel, (i, j) shows the relative position of each peripheral pixel to the current pixel, f (x, y) shows the pixel value of the current pixel in the decoded image, $f(x+i, y+j)$ shows the pixel value of each peripheral pixel in a decoded image, and $g(x, y)$ shows the pixel value of the current pixel after filtering processing. Also, $\alpha_{x, y}(i, j)$ shows the filter coefficient of each peripheral pixel $(i, j)$ to the current pixel $(x, y)$, and the filter coefficient is determined by the product of the first filter coefficient $\alpha 1_{x, y}(i, j)$ and the second filter coefficient $\alpha 2_{x, y}(i, j)$. Here, the first filter coefficient $\alpha 1_{x, y}(i, j)$ is designed so that the filter coefficient of a peripheral pixel increases in response to getting nearer to the current pixel, and the second filter coefficient $\alpha 2_{x, y}(i, j)$ is designed so that the filter coefficient of a peripheral pixel increases in response to its pixel value getting nearer to the pixel value of the current pixel.

Note that σ is a parameter for adjusting the influence of the distance from the current pixel to each peripheral pixel on the first filter coefficient $\alpha 1_{x, y}(i, j)$, and t is a parameter for adjusting the influence of the differential value between the pixel value of the current pixel and the pixel value of each peripheral pixel on the second filter coefficient $\alpha 2_{x, y}(i, j)$.

The biggest feature of this filter is the calculation method of the second filter coefficient $\alpha 2_{x, y}(i, j)$.

Here, FIG. 3 shows the relation between the differential value between the pixel value of the current pixel and the pixel value of each peripheral pixel, and the value of the second filter coefficient $\alpha 2_{x, y}(i, j)$ that is calculated from this differential value.

As is evident from this FIG. 3, a big value is set as the second filter coefficient $\alpha 2_{x, y}(i, j)$ when the pixel value of a peripheral value is close to the pixel value of the current pixel, on the contrary, a small value is set as the second filter coefficient $\alpha 2_{x, y}(i, j)$ when the pixel value of a peripheral value is widely different from the pixel value of the current pixel.

Here, a strong smoothing is performed when a big value is set as parameter t because a big filter coefficient is set in the case of a peripheral pixel whose pixel value is widely different from the pixel value of the current pixel. On the contrary, a weak smoothing is performed when a small value is set as parameter t because a small filter coefficient is set in the case of peripheral pixels except the peripheral pixels whose pixel values are very close to the pixel value of the current pixel. Therefore, there is a need to preset the optimum constant value as parameter t according to the purpose of the processing when applying the SUSAN filter.

The case for eliminating mosquito noises using this SUSAN filter will be considered.

As mentioned earlier, mosquito noises occur as fuzzy dots around strong edges.

FIG. 4 is a diagram schematically showing the relation between edges and mosquito noises. Note that the value of parameter t of the SUSAN filter should be set well smaller than the tone changes on edges and well bigger than the tone changes of mosquito noises. Here, because a very small filter coefficient is set on pixels including edges that have a pixel value widely different from the pixel value of the current pixel by the effect of the second filter coefficient $\alpha 2_{x, y}(i, j)$ without exerting much influence on the filter processing in effect when applying the SUSAN filter on pixels with mosquito noises, filter processing is performed setting a big filter coefficient on pixels with mosquito noises around the current pixel that have a pixel value close to the pixel value of the current pixel. Therefore, it is possible to keep edges sharp and eliminate mosquito noises effectively.

Considering this, filtering processing where filter coefficients are determined based on the differential value between the pixel value of the current pixel and the pixel value of the peripheral pixel is very effective so as to eliminate mosquito noises keeping the edge sharp.

Also, the following image processing apparatus has been conventionally considered (refer to patent literature 1): an image processing apparatus for eliminating noises from image data divided into a plurality of blocks block by block, and it comprises a judging unit operable to calculate frequency distribution of differential value between the neighboring pixels block by block based on image data for respective blocks and judge whether any edge is included as to each block based on the frequency distribution and a selection unit operable to select blocks where noises should be eliminated based on the result judged by the judging unit. Note that this technique is also written as "the second prior art" from here.

This second prior art makes it possible to eliminate mosquito noises and keep textures sharp by a simple processing because filter (E filter) processing is performed on blocks including edges and no filter processing is performed on blocks without edges as shown in FIG. 5.

[non-patent literature 1]
S. M. Smith and J. M. Brady, "SUSAN—A New Approach to Low Level Image Processing, "International Journal of Computer Vision, vol. 23, no. 1, pp. 45-78, 1997.
[patent literature 1]
U.S. Pat. No. 3,011,828 (FIG. 1 in the first page)

However, according to the first prior art, when using the SUSAN filter so as to eliminate mosquito noises, a distinctive effect of keeping edges sharp even when eliminating mosquito noises that occurred in the sign area of the signboard is obtainable as shown in FIG. 6, but there occurs a problem of causing great degree of blur in the texture area such as the area of leaves. This comes from eliminating the tone change of the texture that existed in the original image when performing filter processing on the texture area using this parameter t because there is a need to set the value of parameter t to a value that is much bigger than the degree of the tone change of mosquito noises so as to eliminate mosquito noises effectively.

On the contrary, according to the second prior art, it is possible to keep textures sharp without affecting the effect in eliminating mosquito noises, but there occurs a new problem that mosquito noises are not completely eliminated or that image quality excessively changes depending on the existence of an edge because no filter processing is performed on dull edges.

SUMMARY OF THE INVENTION

Therefore, this present invention aims at providing an image processing apparatus and an image processing method for keeping both edges and textures sharp without affecting the effect in eliminating mosquito noises and avoiding remaining mosquito noises on dull edges or excessive changes in image quality depending on the existence of an edge.

Considering the above mentioned problems, the image processing apparatus of the present invention is for performing filter processing on a decoded image that is obtained by decoding compressed data obtained by coding a multi-valued image by a block of M×N pixels so as to eliminate noises and generating a reconstructed image, the image processing apparatus comprising: a differential value calculation unit operable to calculate a differential value between a pixel value of a current pixel and each one of pixel values of peripheral pixels in a filter processing area that is predetermined for each pixel that forms the decoded image, a distribution coefficient calculation unit operable to calculate distribution coefficients as to the pixel values of the pixels, a filter coefficient calculation unit operable to calculate the filter coefficients as to the peripheral pixels based on the differential values calculated by the differential value calculation unit and the distribution coefficients calculated by the distribution coefficient calculation unit, and a filter processing unit operable to perform filter processing as to the pixel value of the current pixel in the decoded image using the filter coefficient calculated by the filter coefficient calculation unit and calculate the pixel value of the current pixel in the reconstructed image.

Here, a filter coefficient should be increased in response to the increase in the distribution coefficient as long as the increase in the filter coefficient does not affect edges. By doing so, as the distribution coefficient value is big in the filter processing area including edges, a big filter coefficient is set for the peripheral pixels which have pixel values widely different from the pixel values of the current pixel and a strong smoothing is performed, and thus it is possible to eliminate mosquito noises effectively without blurring edges. On the other hand, a filter coefficient should be decreased in response to the decrease in the distribution coefficient. By doing so, as the distribution coefficient value is small in the filter processing area without edges such as texture area, a small filter coefficient is set on the peripheral pixels except the peripheral images that have a pixel value very close to the pixel value of the current pixel and a weak smoothing is performed, and thus it is possible to keep edges and textures sharp. Furthermore, this processing is different from the conventional processing where blocks are divided into the blocks to be filter processed or the blocks not to be filter processed, in other words, an appropriate filter processing is performed on all the filter processing areas, and thus it is possible to surely avoid the situation where mosquito noises are not completely eliminated or the image quality of blocks excessively varies depending on the existence of an edge.

More specifically, in the image processing apparatus of the present invention, the distribution coefficient calculation unit may calculate the distribution coefficients of the pixel values of the respective pixels by the block of M×N pixels.

In this way, it is possible to easily calculate the distribution coefficient of pixel values by the block and perform an appropriate filter processing on all the filter processing areas.

Also, in the image processing apparatus of the present invention, the distribution coefficient calculation unit can be formed in a way that it calculates the distribution coefficient of the pixel values by the block, interpolates the distribution coefficients of the pixel values in the calculated block and the distribution coefficients of the pixel values in neighboring blocks of the block, calculates the interpolation distribution coefficients as to pixel values of the respective pixels, and uses the calculated interpolation distribution coefficients as the distribution coefficients to pixel values of the respective pixels.

In this way, it is possible to realize a filter processing where the degree of smoothing changes gradually because the distribution coefficient changes gradually at the boundary of blocks.

Also, in the image processing apparatus of the present invention, the distribution coefficient calculation unit can be formed in a way that it comprises an edge strength calculation unit operable to calculate the edge strength of the peripheral pixels in the predetermined edge influence calculation area, and a maximum edge influence calculation unit operable to calculate the edge strength of the peripheral pixels that are calculated by the edge strength calculation unit and the edge influence on the current pixel based on the distance between the current pixel and the peripheral pixel, and to calculate the maximum value of the calculated edge influence as the distribution coefficient as to pixel values of the respective pixels.

In this way, it is possible to realize a filter processing where the degree of smoothing changes gradually because the distribution coefficient changes gradually based on the edge strength of the peripheral pixels and the distance between the current pixel and peripheral pixels even when the boundary of blocks is unknown.

Here, the distribution coefficient calculation unit may calculate the differential value by subtracting a minimum value from a maximum value of a pixel value in the block as a distribution coefficient of pixel values of the current block.

It is possible to easily calculate the distribution coefficient in this way.

Also, the distribution coefficient calculation unit can calculate a variance value from an average pixel value in the block as a distribution coefficient of pixel values of the current block.

It is also possible to easily calculate the distribution coefficient in this way.

Also, the distribution coefficient calculation unit can calculate maximum edge strength in the block as a distribution coefficient of pixel values of the current block.

It is also possible to easily calculate the distribution coefficient in this way.

Note that the present invention can be realized not only as the image processing apparatus like this, but also as an image processing method where these characteristic units of this image processing apparatus are made to be steps or as a program for having a computer execute these steps. Also, it is needless to say that the program like this can be distributed via a recording medium such as a CD-ROM or a communication medium such as the Internet.

As is evident from the above explanation, according to the image processing apparatus of the present invention, since the value of the distribution coefficient is big in filter processing areas that include edges, a big filter coefficient is set on the peripheral pixels that have widely different pixel values compared to the pixel value of the current pixel and a strong smoothing is performed, and thus it is possible to eliminate mosquito noises effectively. On the other hand, since the value of the distribution coefficient is small in filter processing areas that do not include edges, such as texture areas, a small filter coefficient is set on the peripheral pixels except the peripheral pixels that have a pixel value very close to the pixel value of the current pixel and a weak smoothing is performed, and thus it is possible to keep edges and textures sharp. Furthermore, this processing is different from the conventional processing where blocks are divided into the blocks to be filter processed or the blocks not to be filter processed, in other words, an appropriate filter processing is performed on all the pixels, and thus it is possible to surely avoid the situation where mosquito noises are not completely eliminated or the image quality of blocks excessively varies depending on the existence of an edge.

In this way, the present invention makes it possible to realize a high quality reconstructed image, and it is highly practical in these days when a digital camera and the like, a high-definition printer, a projector and so on are becoming increasingly popular.

FURTHER INFORMATION ABOUT TECHNICAL BACKGROUND TO THIS APPLICATION

Japanese Patent application No. 2002-301602 filed Oct. 16, 2002 is incorporated herein by reference.

BRIEF DESCRIPTION OF THE DRAWINGS

These and other subjects, advantages and features of the invention will become apparent from the following description thereof taken in conjunction with the accompanying drawings that illustrate specific embodiments of the invention. In the Drawings:

FIG. 18 is a diagram showing the structure of the Sobel filter. Especially, FIG. 18A is a diagram showing the structure of the Sobel filter that is applied horizontally, and FIG. 18B is a diagram showing the structure of the Sobel filter that is applied vertically.

DESCRIPTION OF THE PREFERRED EMBODIMENT(S)

Embodiments of the present invention will be explained with reference to figures below.

First Embodiment

Figure 7:
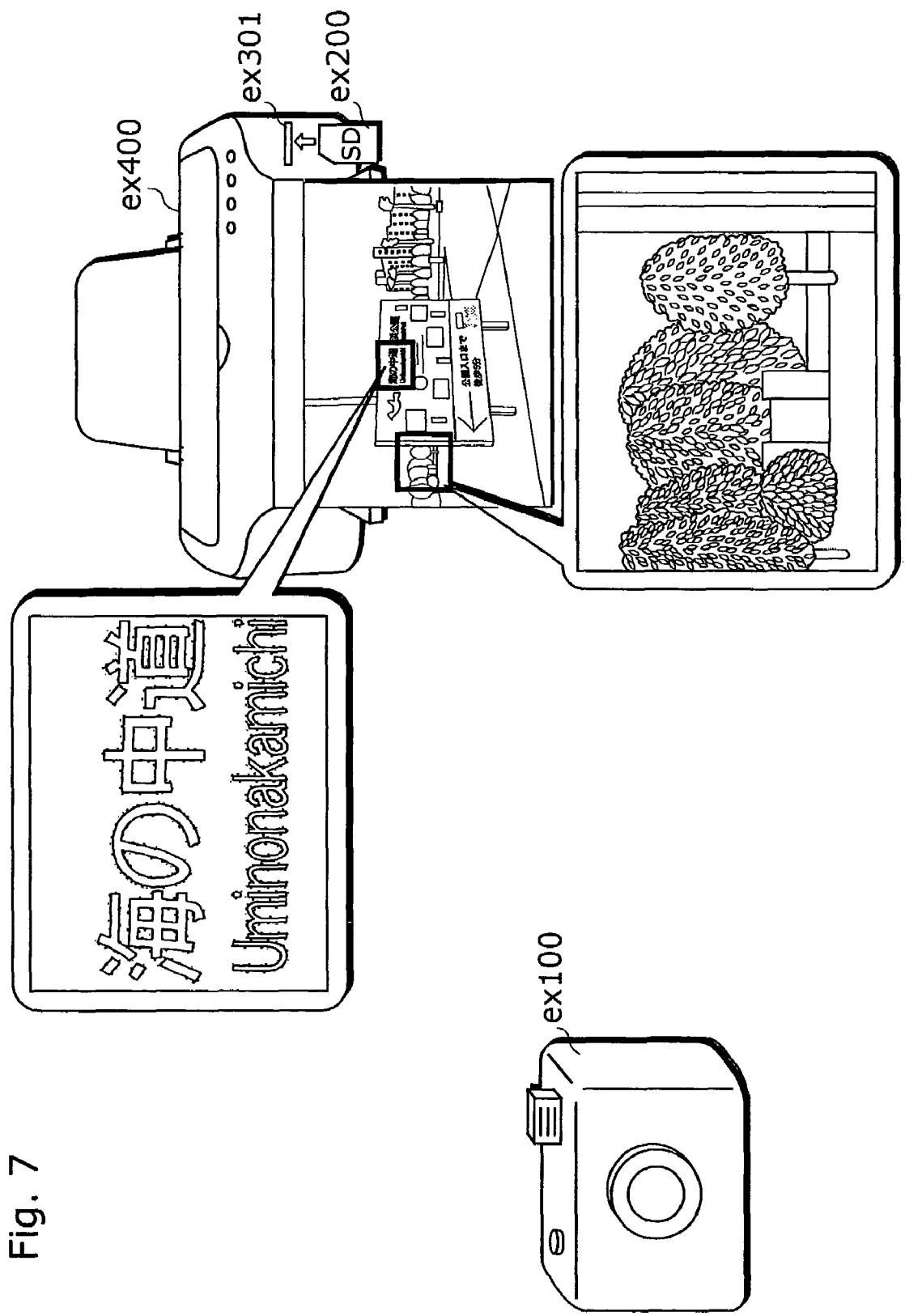
FIG. 7 is a diagram showing the external view of a digital camera and a printer.

FIG. 7 is a diagram showing the external view of a digital camera and a printer.

Figure 1:
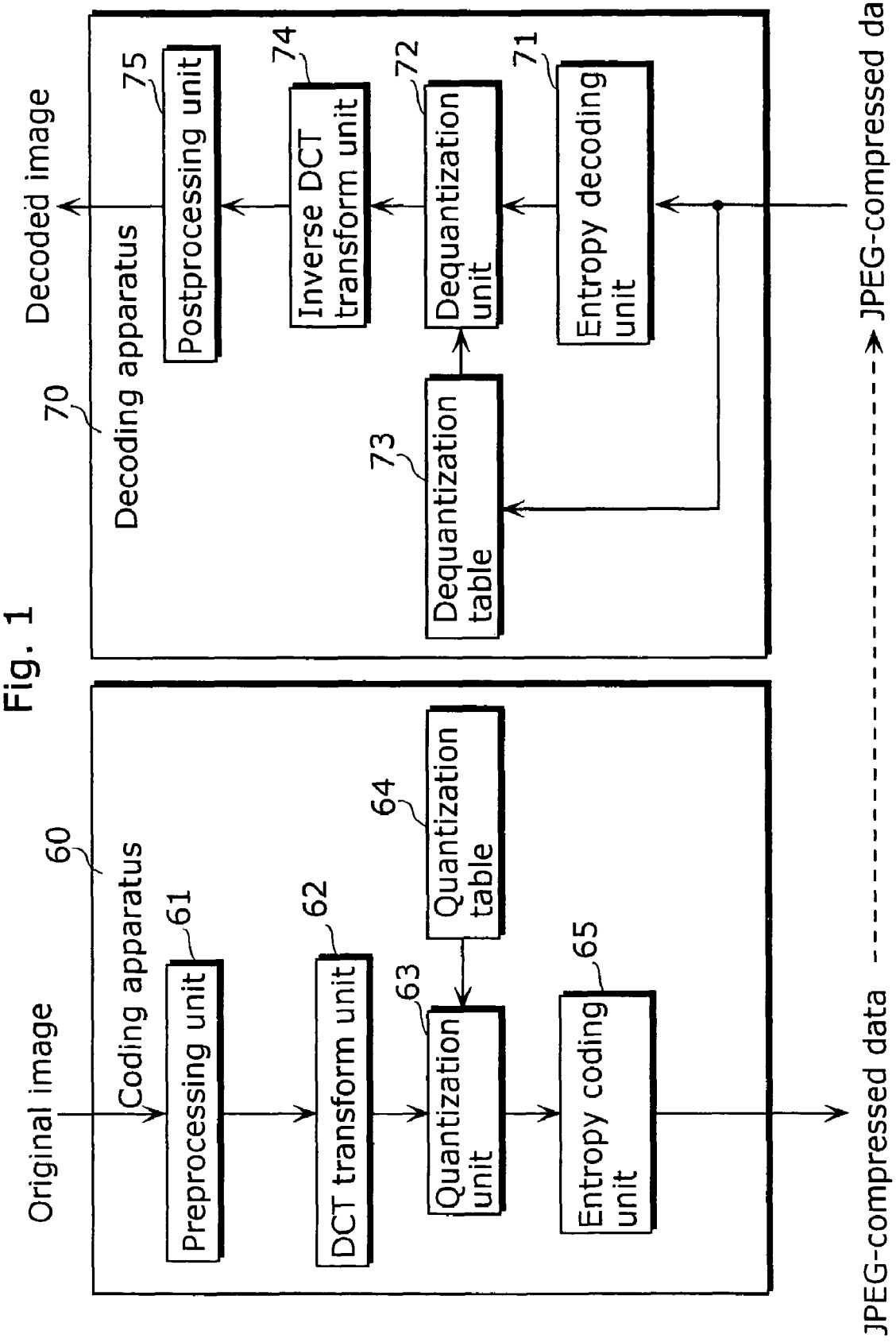
FIG. 1 is a block diagram showing the functional structure of the JPEG coding apparatus and the JPEG decoding apparatus.
Figure 2:
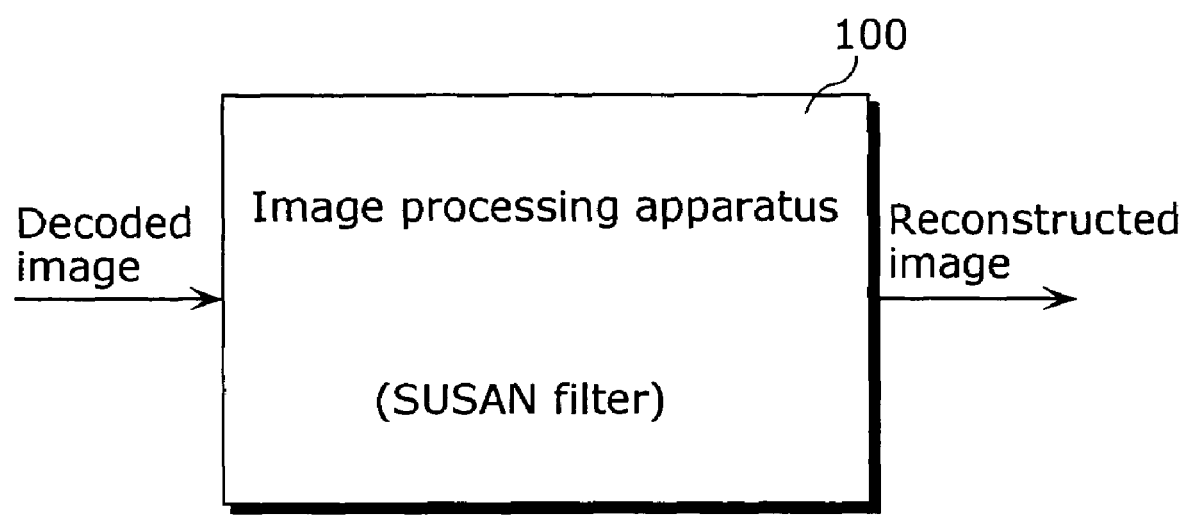
FIG. 2 is a diagram showing the conventional image processing apparatus (the SUSAN filter) 100.
Figure 3:
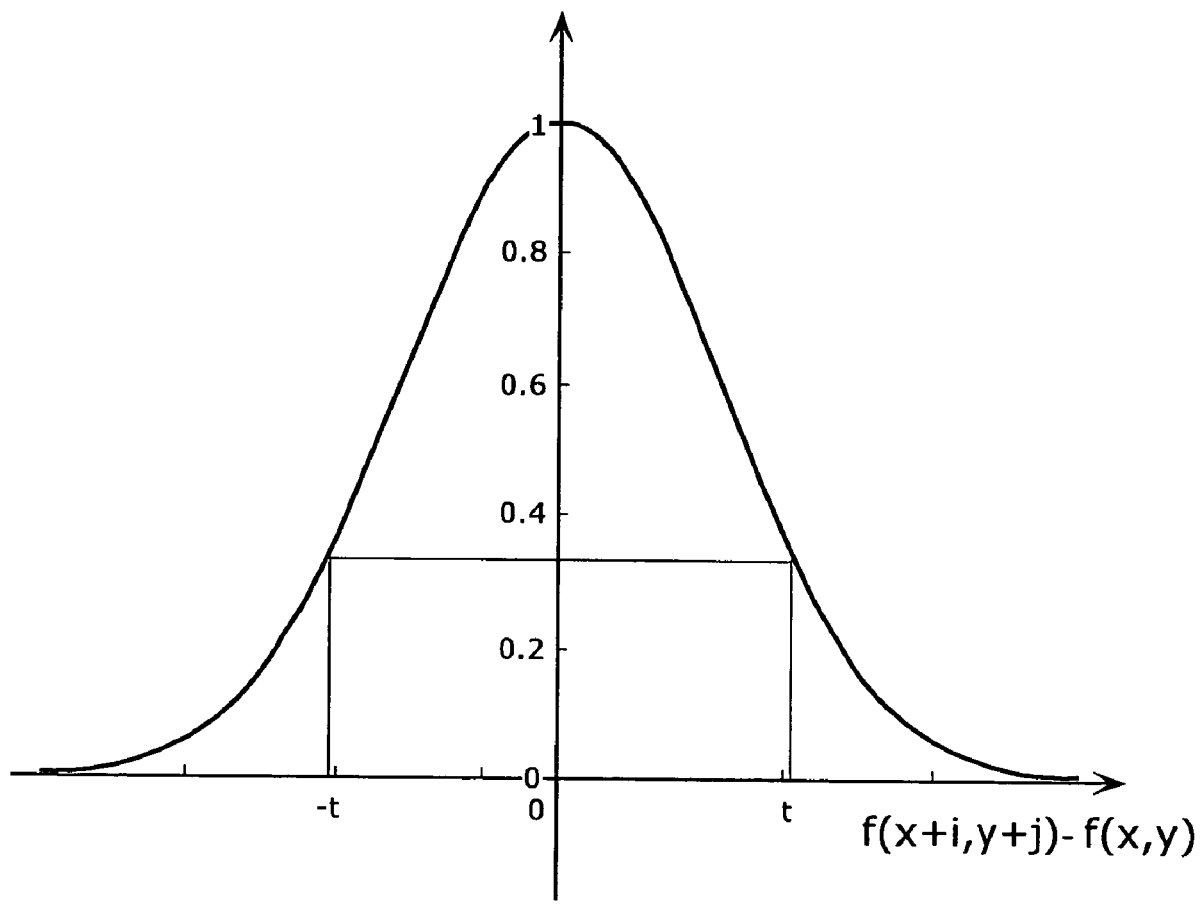
FIG. 3 is a diagram showing the differential value between the pixel value of the current pixel and the pixel value of each peripheral pixel, the second filter coefficient value $\alpha 2_{xy}$ (i, j) calculated from this differential value, and the relation between the differential value and the value of the second filter coefficient $\alpha 2_{xy}$ (i, j).
Figure 4:
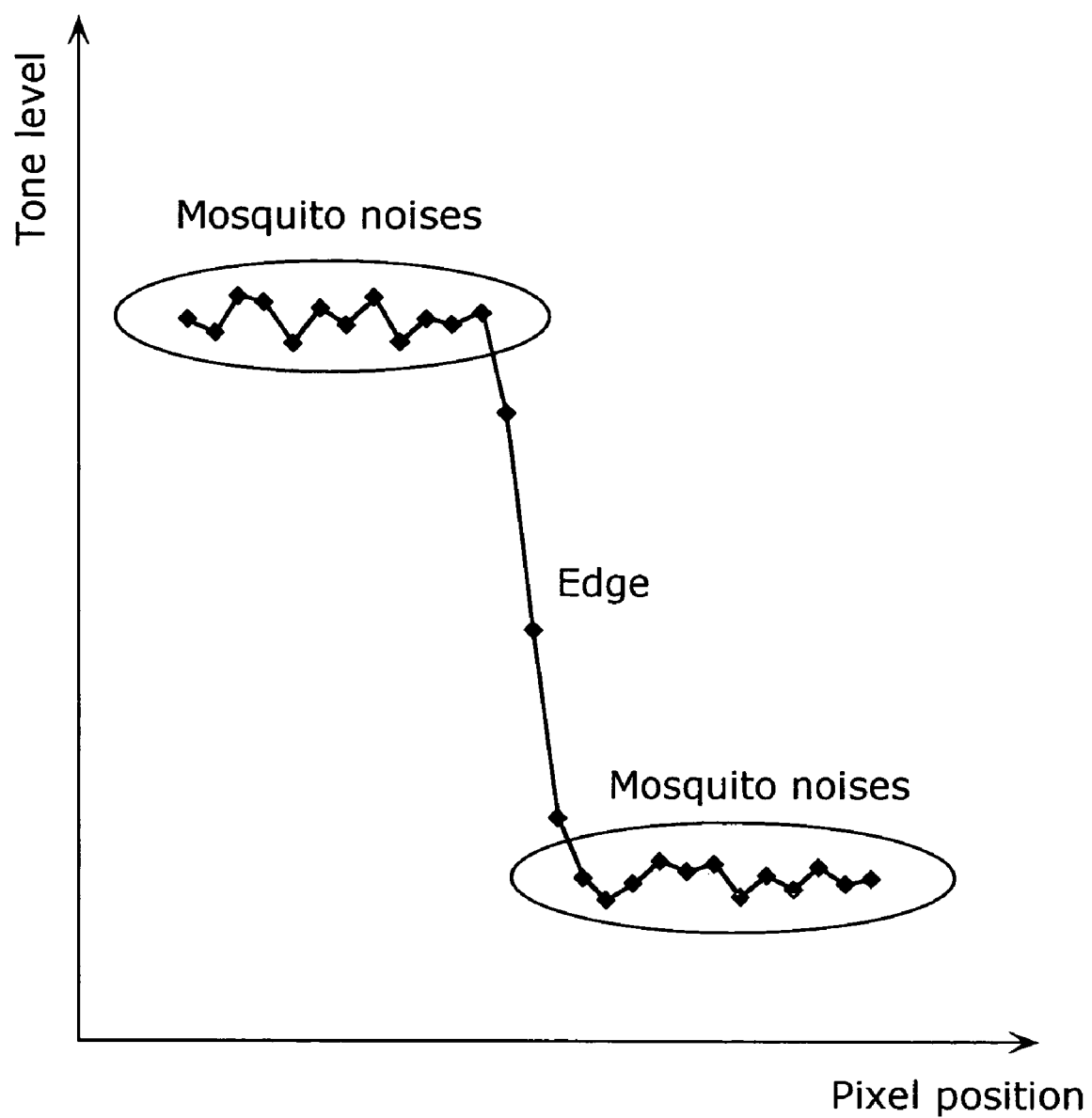
FIG. 4 is a diagram schematically showing the tone change of edges and mosquito noises.
Figure 5:
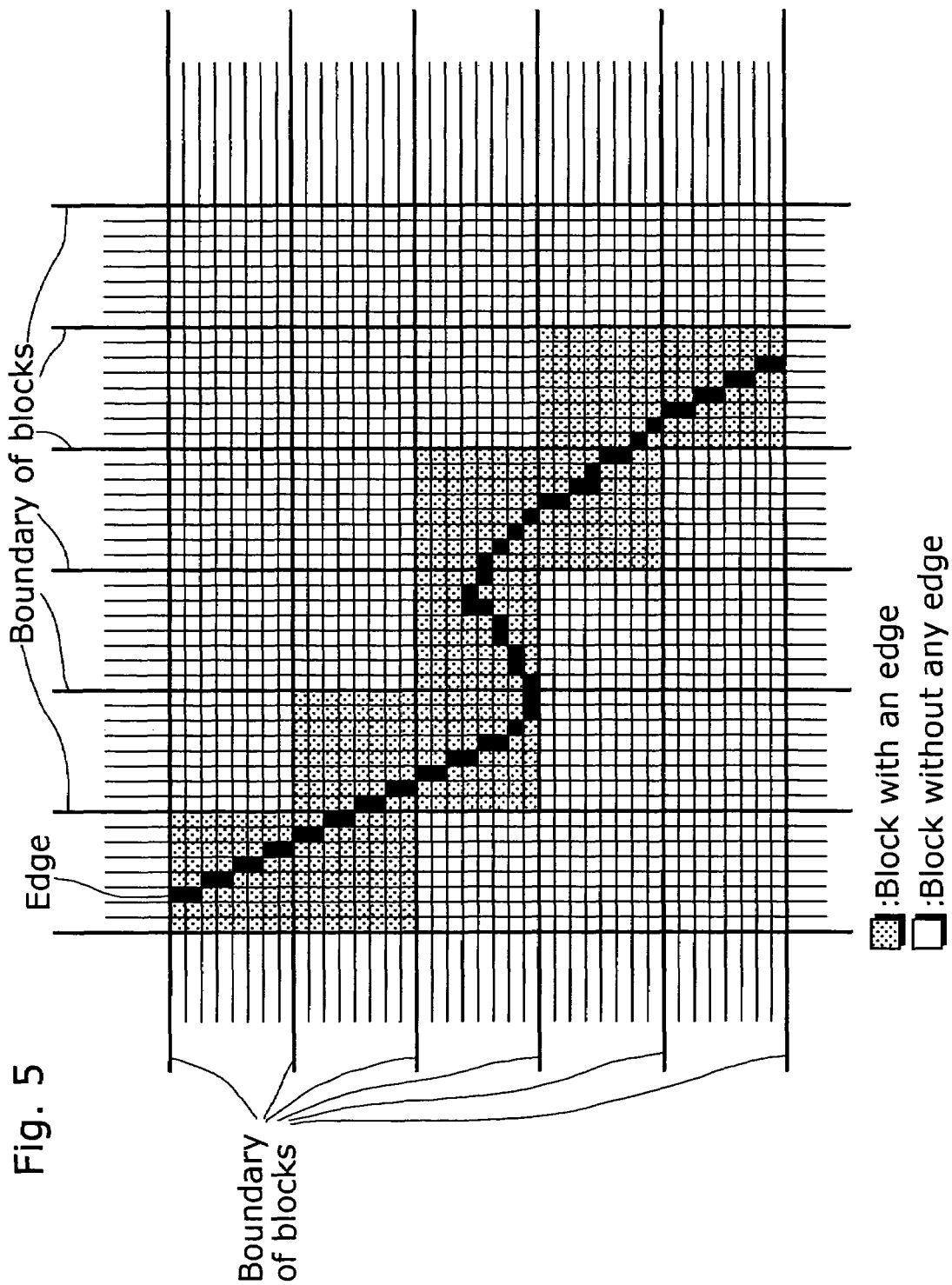
FIG. 5 is a diagram schematically showing the conventional filter processing.
Figure 6:
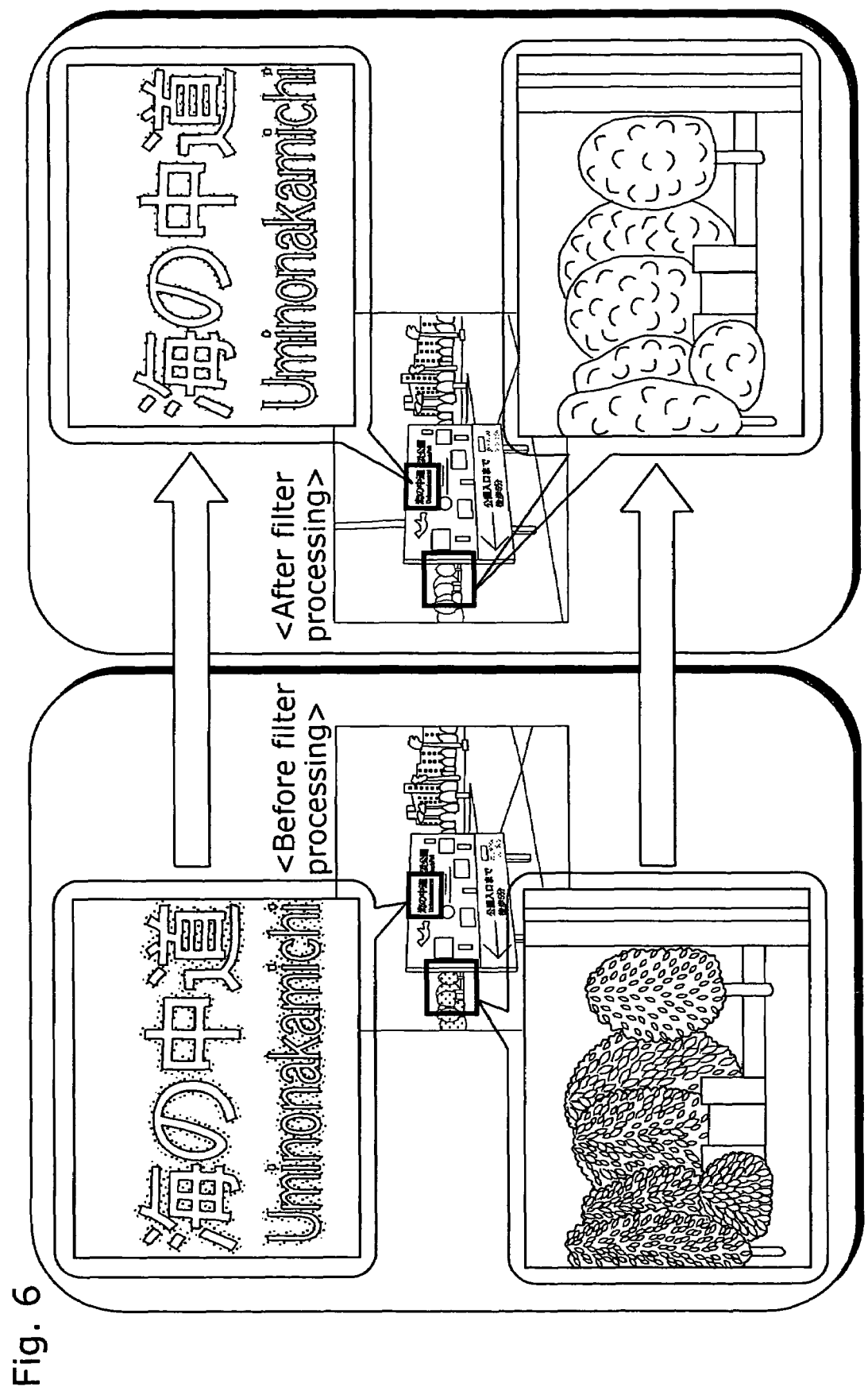
FIG. 6 is a diagram schematically showing a decoded image before performing a filter processing using the SUSAN filter and a reconstructed image after performing a filter processing using the SUSAN filter.

A digital camera ex100 comprises a color image sensor such as a CCD or a CMOS, the above-mentioned image coding apparatus 60 (refer to FIG. 1) and so on, and it generates the JPEG-compressed data by coding the original image obtained by the color image sensor block by block using the coding apparatus 60 and records the generated JPEG-compressed data on the SD card ex200.

The printer ex400 has the so-called direct print function and comprises a card reader ex301 for setting the SD card ex200, the image decoding apparatus 70 mentioned above, an image processing apparatus, a preprocessing unit, a printer engine and the like.

The printer ex400 reads out the JPEG-compressed data that is specified by a user from the SD card ex200, decodes the data by an entropy decoding unit 71, a dequantization unit 72, a dequantization table 73, and an IDCT transform unit 74 in the decoding apparatus 70, and generates a decoded image of YCbCr data. Note that this decoded image includes mosquito noises that occurred around edges.

The image processing apparatus eliminates mosquito noises and keeps edges and textures sharp by performing a filter processing to Y component in the decoded image of YCbCr data that is outputted from the IDCT transform unit 74, plus it generates a reconstructed image without the possibility of remaining mosquito noises around dull edges or excessive changes in image quality depending on the existence of an edge.

The post-processing unit 75 of the decoded apparatus 70 transforms the decoded image into a reconstructed image in RGB color based on the Y component that is filter processed by the image processing apparatus and CbCr data in the original image.

The pre-processing unit transforms the reconstructed image in RGB color into a reconstructed image in YMCK color.

The printer engine reproduces the reconstructed image in YMCK color on a piece of paper. Here, the reconstructed image generated by the image processing apparatus keeps edges or textures sharp and avoids excessive changes in image quality depending on the existence of an edge, and eliminates mosquito noises. Therefore, in the reconstructed image that is reproduced on a piece of paper, it is possible to keep edges and textures sharp, avoid excessive changes in image quality depending on the existence of an edge, eliminate mosquito noises irrespective of the degree of the edge strength.

Figure 8:
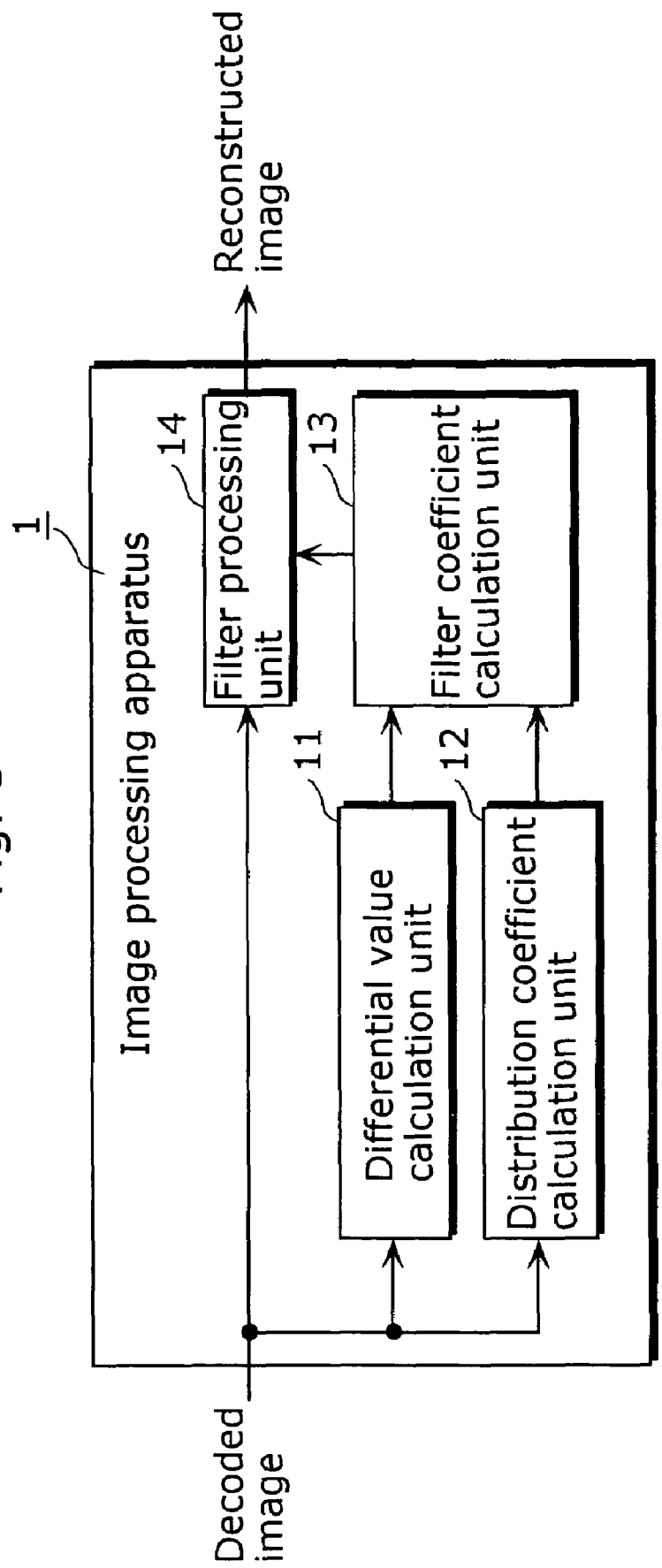
FIG. 8 is a block diagram showing the functional structure of the image processing apparatus that is implemented in the printer ex400 shown in FIG. 7.

FIG. 8 is a block diagram showing the functional structure of the image processing apparatus that is implemented in the printer ex400 shown in FIG. 7.

The image processing apparatus 1 generates a reconstructed image by performing filter processing to the Y component in the decoded image block by block, and it comprises a differential value calculation unit 11, a distribution coefficient calculation unit 12, a filter coefficient calculation unit 13 and a filter processing unit 14 as shown in FIG. 8.

The differential value calculation unit 11 calculates the differential value between the pixel value of the current pixel and the pixel value of each peripheral pixel.

The distribution coefficient calculation unit 12 calculates the distribution coefficient of pixel value in each block.

The filter coefficient calculation unit 13 calculates respective filter coefficients to the respective peripheral pixels based on the differential value calculated by the differential value calculation unit 11 and the distribution coefficient calculated by the distribution coefficient calculation unit 12.

The filter processing unit 14 performs filter processing using filter coefficients to the respective peripheral pixels calculated in the filter coefficient calculation unit 13 and generates a reconstructed image after noise elimination.

Note that the differential value calculation unit 11, the distribution coefficient calculation unit 12, the filter coefficient calculation unit 13 and the filter processing unit 14 that are make up the above-mentioned image processing apparatus 1 are composed of a CPU, a ROM that prestores an image processing program and a RAM that provides a work area and the like for executing the image processing program.

The filter processing unit 14 of this image processing apparatus 1 can be shown by the following formula (5).

$$g(x, y) = \frac{\sum_{i,j} \{f(x+i, y+j) \cdot \beta_{x,y}(i, j)\}}{\sum_{i,j} \{\beta_{x,y}(i, j)\}} \quad (5)$$

where $$\beta_{x,y}(i,j) = \exp\left[-\{v_{x,y}(i,j)\}^2 / \{U(X,Y)/K\}^2\right] \quad (6)$$

$$v_{x,y}(i,j) = f(x+i, y+j) - f(x,y) \quad (7)$$

$$U(X,Y) = \max\{f(x,y)\} - \min\{f(x,y)\} \quad (8)$$

Here, in the above formulas (5)~(8), (x, y) shows the position of the current pixel, (i, j) shows the relative position of each peripheral pixel to the current pixel, f (x, y) shows the pixel value of the current pixel in a decoded image, f (x+i, y+j) shows the pixel value of the each peripheral pixel in the decoded image, g (x, y) shows the pixel value of the current pixel in the reconstructed image after filter processing. Also, (X, Y) shows the position of the block that includes the current pixel (x, y), $\beta_{x, y}$ (i, j) shows the filter coefficient of each peripheral pixel (i, j) to the current pixel (x, y), $v_{x, y}$ (i, j) shows the differential value between the pixel value f (x, y) of the current pixel and pixel value f (x+i, y+j) of each peripheral pixel, U (X, Y) shows a value (distribution coefficient) after subtracting the minimum value from the maximum value in pixel values in the block (X, Y), and K shows the constant value that is previously set.

Next, the operation when generating a reconstructed image from a decoded image using the image processing apparatus 1 that is formed like mentioned above will be explained.

Figure 9:
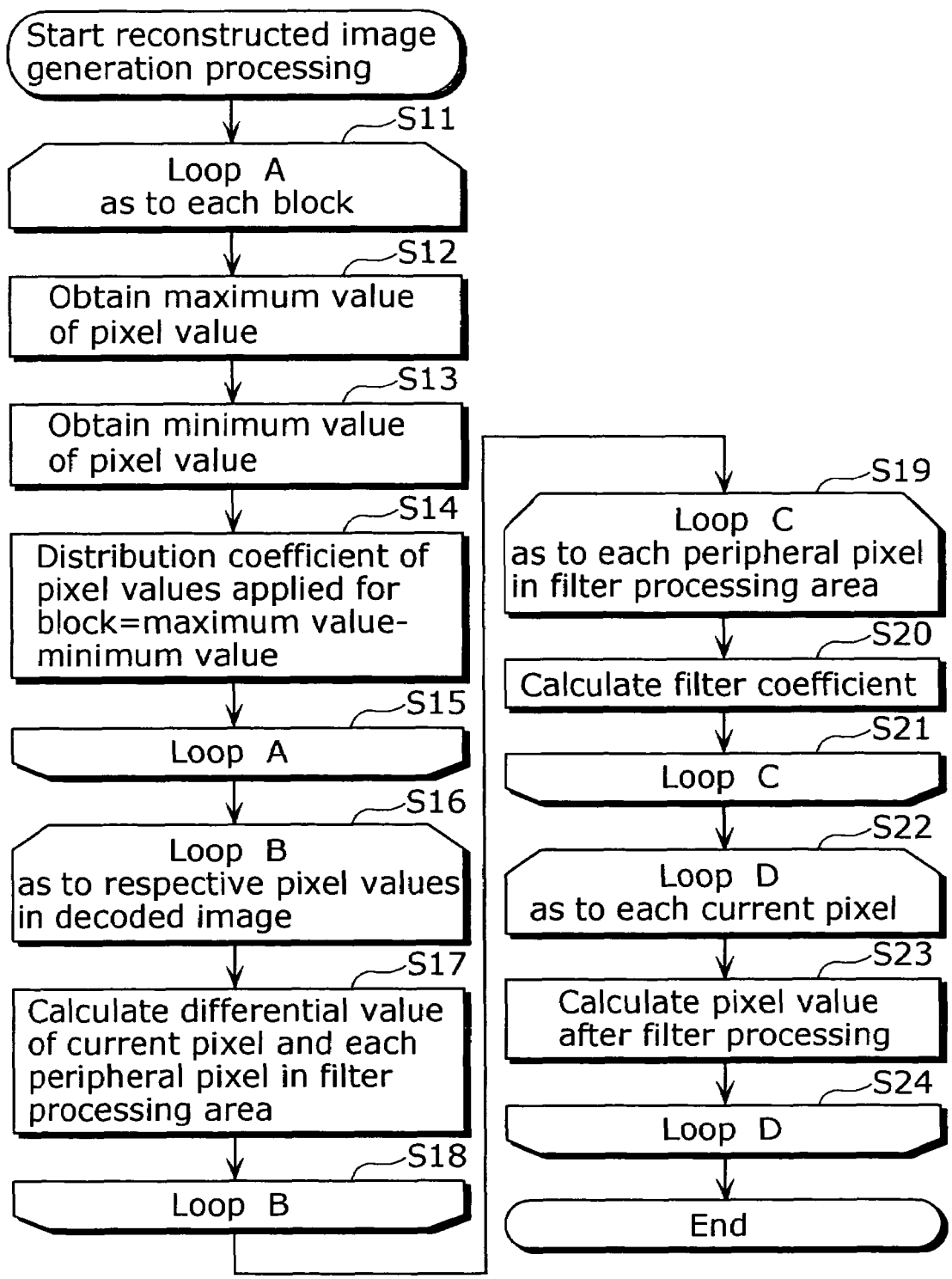
FIG. 9 is a flow chart showing the operation when the image processing apparatus 1 generates a reconstructed image from a decoded image.

FIG. 9 is a flow chart showing the operation when generating a reconstructed image from a decoded image in the image processing apparatus 1. Note that, the image processing apparatus 1 preobtains the information showing where the boundary of blocks exists in the decoded image before generating a reconstructed image in the process of decoding the JPEG-compressed data.

The image processing apparatus 1 repeatedly executes the following processing as to all the blocks (S11).

First, the distribution coefficient calculation unit 12 obtains the maximum values and the minimum values of the pixel values in the respective blocks of M×N pixels (the area enclosed by the boundary of blocks shown in FIG. 10) block by block in order (S12, S13), subtracts the minimum values min {f (x, y)} from the maximum values max {f (x, y)} in the respective blocks, and calculates the subtracted values as the distribution coefficients U (X, Y) that are applied for the respective blocks (S14).

When finishing the calculation of the distribution coefficients that are applied for the respective blocks (S15), the differential value calculation unit 11 repeatedly executes the following processing on the respective pixels in the decoded image (S16). The differential value calculation unit 11 calculates the differential values $v_{x, y}$ (i, j) between the pixel value f (x, y) of a current pixel and pixel values f (x+i, y+j) of the respective peripheral pixels in the filter processing area (all the peripheral pixels included in the filter processing area shown in FIG. 10) (S17).

Figure 10:
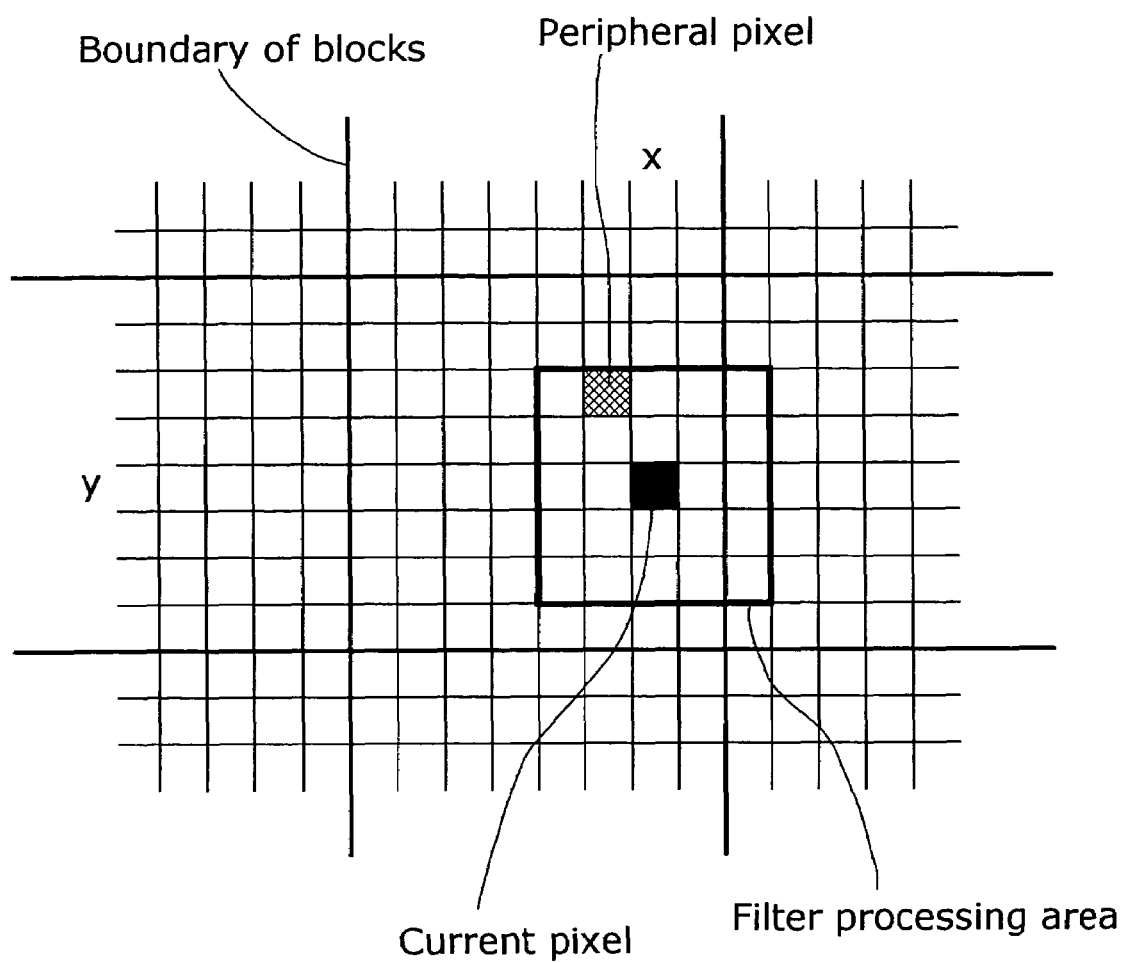
FIG. 10 is a diagram showing the positional relation of a current pixel, a filter processing area and blocks.

Here, FIG. 10 shows the relation between the current pixel, the area of peripheral pixels that are used for filter processing (filter processing area), and blocks that are divided into blocks of M×N pixels by the boundary of blocks. Note that this FIG. 10 shows the case where the filter size is 5×5 and the block size is 8×8, these sizes are not the ones available in this present invention. Also, as to the filter processing area, a square is not the one available as a filter processing area.

When finishing the calculation of all the differential values $v_{x, y}$ (i, j) (S18), the filter coefficient calculation unit 13 repeatedly executes the following processing as to the respective peripheral pixels in the filter processing area (S19). The filter coefficient calculation unit 13 calculates the filter coefficients $\beta_{x, y}$ (i, j) as to the peripheral pixels from the differential values $v_{x, y}$ (i, j) calculated by the differential value calculation unit 11 and the distribution coefficients U (X, Y) calculated by the distribution coefficient calculation unit 12 (S20). More specifically, it is possible to obtain the filter coefficients $\beta_{x, y}$ (i, j) using the calculation formula (6). Here, the value that is calculated in the block with a current pixel is used as the distribution coefficient U (X, Y), and the calculated values as to the respective peripheral pixels are used as the differential values $v_{x, y}$ (i, j).

Note that the constant value K in the formula (6) is a parameter for adjusting the influence of the distribution coefficient U (X, Y) in calculating the filter coefficient $\beta_{x, y}$ (i, j), it is possible to preset an appropriate value.

When finishing the calculation of all the filter coefficients $\beta_{x, y}$ (i, j) (S21), the filter processing unit 14 repeatedly executes the following processing as to the respective current pixels (S22). The filter processing unit 14 performs filter processing on a current pixel using filter coefficients $\beta_{x, y}$ (i, j) as to the respective peripheral pixels calculated by the filter coefficient calculation unit 13 and calculates the pixel value of the current pixel after filter processing (S23). When finishing the calculation of pixel values after filter processing as to the respective pixels in all the blocks (S24) by repeatedly executing this processing (S23), a reconstructed image is generated and the reconstructed image generation processing is finished.

When using the image processing apparatus 1 in this first embodiment, big filter coefficients are set on the peripheral pixels in the blocks including an edge that have widely different pixel values compared to the pixel value of the current pixel and a strong smoothing is performed because the value of the distribution coefficient U (X, Y) is big, and thus it is possible to eliminate mosquito noises effectively. On the other hand, in the blocks of textures or the like without any edge, small filter coefficients are set on the peripheral pixels except the peripheral pixels that have a pixel value very close to the pixel value of the current pixel and a weak smoothing is performed because the value of the distribution coefficient U (X, Y) is small, and thus it is possible to keep edges and textures sharp. Furthermore, this processing is different from the conventional processing where blocks are divided into the blocks to be filter processed or the blocks not to be filter processed, in other words, an appropriate filter processing is performed on all the blocks, and thus it is possible to surely avoid the situation where mosquito noises are not completely eliminated or the image quality of blocks excessively varies depending on the existence of an edge.

Second Embodiment

Figure 11:
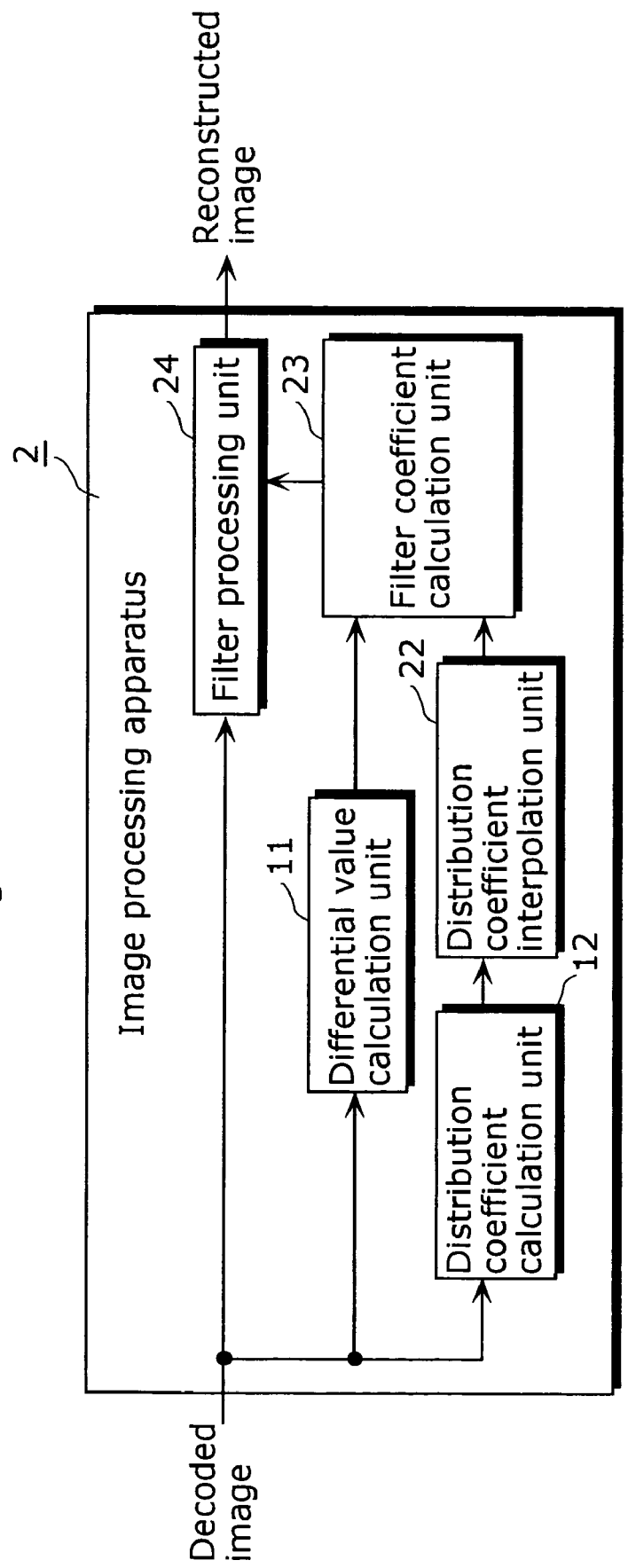
FIG. 11 is a block diagram showing the functional structure of another image processing apparatus that is implemented in the printer 400 shown in FIG. 7.

FIG. 11 is a block diagram showing another functional structure of the image processing apparatus that is implemented in the printer ex400.

The image processing apparatus 2 generates a reconstructed image by performing the filter processing on the Y component of the decoded image block by block, and it comprises a differential value calculation unit 11, a distribution coefficient calculation unit 12, a distribution coefficient interpolation unit 22, a filter coefficient calculation unit 23, and a filter processing unit 24 as shown in FIG. 11. Note that respective units that correspond to the units in the image processing apparatus 1 are given the same reference number, and explanations for these units are omitted.

Here, in the image processing apparatus 1 in the first embodiment, filter coefficients are calculated using the same distribution coefficients U (X, Y) that is the same value in the respective blocks. Generally, coding is performed block by block independently in block coding, noises such as mosquito noises also occur block by block. Therefore, it is possible to keep textures sharp and eliminate mosquito noises effectively by adjusting the degree of smoothing block by block like the above-mentioned processing, but there is a conceivable case where performing filter processing in a way that it can prevent the degree of smoothing from becoming not gradual around the boundary of blocks is preferred.

Therefore, this image processing apparatus 2 further comprises a distribution coefficient interpolation unit 22 operable to perform linear interpolation on the distribution coefficient of the block and the distribution coefficients of peripheral blocks two-dimensionally using a plurality of distribution coefficients, and the distribution coefficient interpolation unit 22 in this image processing apparatus 2 is formed in a way that it calculates interpolation distribution coefficients u (x, y) that are gradually changing from pixel to pixel, calculates filter coefficients using these interpolation distribution coefficients and realizes filter processing where the degree of smoothing changes gradually around the boundary of blocks.

Next, the operation when generating a reconstructed image from a decoded image using the image processing apparatus 2 that is formed like mentioned above will be explained.

Figure 12:
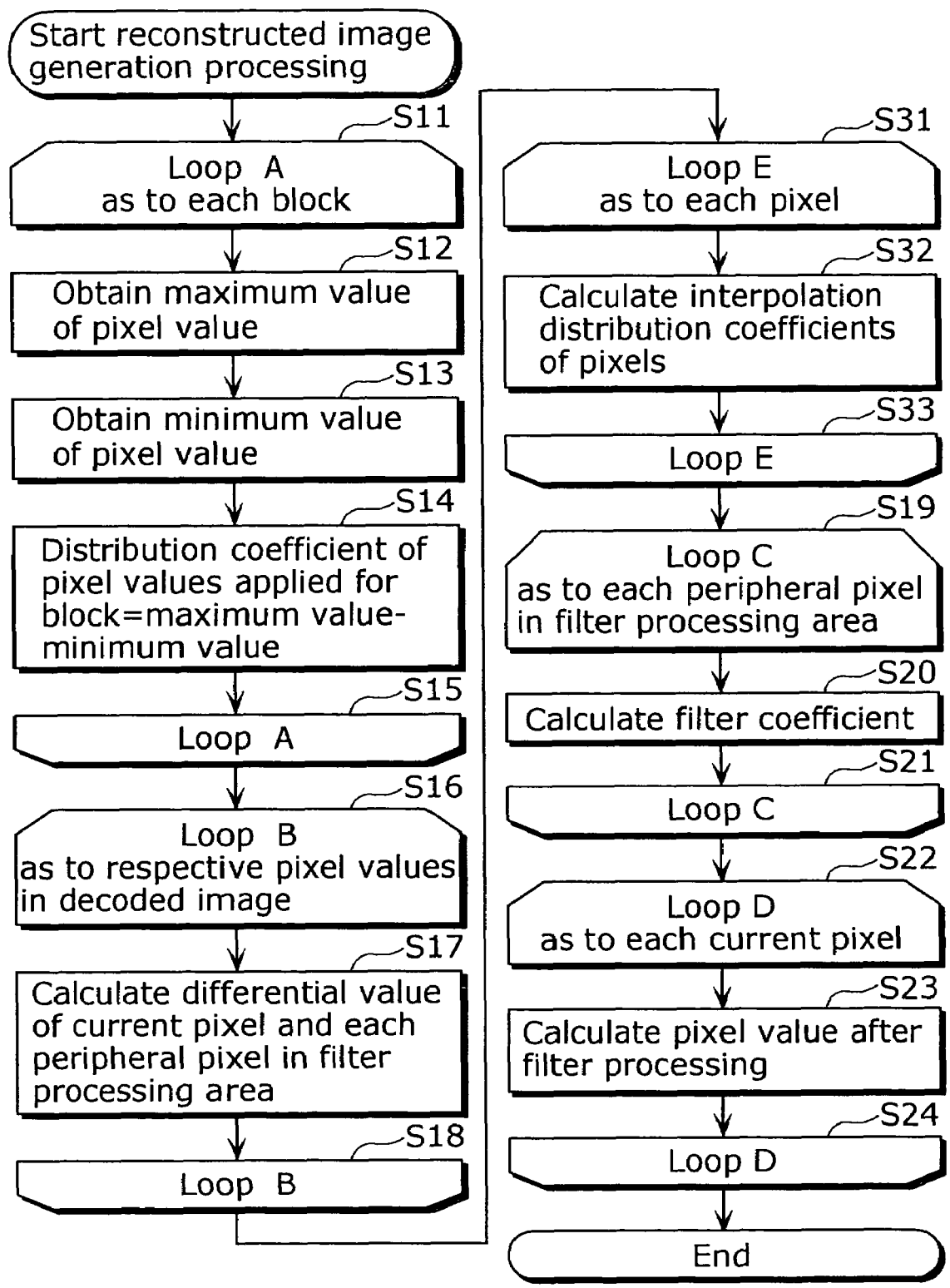
FIG. 12 is a flow chart showing the operation when the image processing apparatus 2 generates a reconstructed image from a decoded image.

FIG. 12 is a flow chart showing the operation for generating a reconstructed image from a decoded image in the image processing apparatus 2. Note that, the image processing apparatus 2 preobtains the information on the position of the boundary of blocks in the decoded image in the process of decoding the JPEG-compressed data when generating a reconstructed image as with the image processing apparatus 1.

The image processing apparatus 2 repeatedly executes the following processing as to the respective blocks (S11).

First, the distribution coefficient calculation unit 12 obtains the maximum values and the minimum values of the pixel values in the respective blocks of M×N pixels (the area enclosed by the boundary of blocks shown in FIG. 10) block by block in order (S12 and S13), subtracts the minimum values min {f (x, y)} from the maximum values max {f (x, y)} in the respective blocks, and calculates the subtracted values as the distribution coefficients U (X, Y) that are applied for the respective blocks (S14).

When finishing the calculation of the distribution coefficients that are applied for the respective blocks (S15), the differential value calculation unit 11 repeatedly executes the following processing on the respective pixels in the decoded image (S16).

The differential value calculation unit 11 respectively calculates the differential values $\upsilon_{x,y}$ (i, j) between the pixel value f (x, y) of a current pixel and pixel values f (x+i, y+j) of the respective peripheral pixels in the filter processing area (all the peripheral pixels included in the filter processing area shown in FIG. 10) (S17).

When finishing the calculation of all the differential values $\upsilon_{x,y}$ (i, j) (S18), the distribution coefficient interpolation unit 22 repeatedly executes the following processing as to the respective pixels (S31). The distribution coefficient interpolation unit 22 calculates the interpolation distribution coefficients u (x, y) of pixel values of the respective pixels (S32) using the distribution coefficient U (X, Y) as to the block including the current pixel shown in FIG. 13 and distribution coefficients U (X−1, Y−1), U (X, Y−1), U (X−1, Y) as to peripheral blocks.

Figure 13:
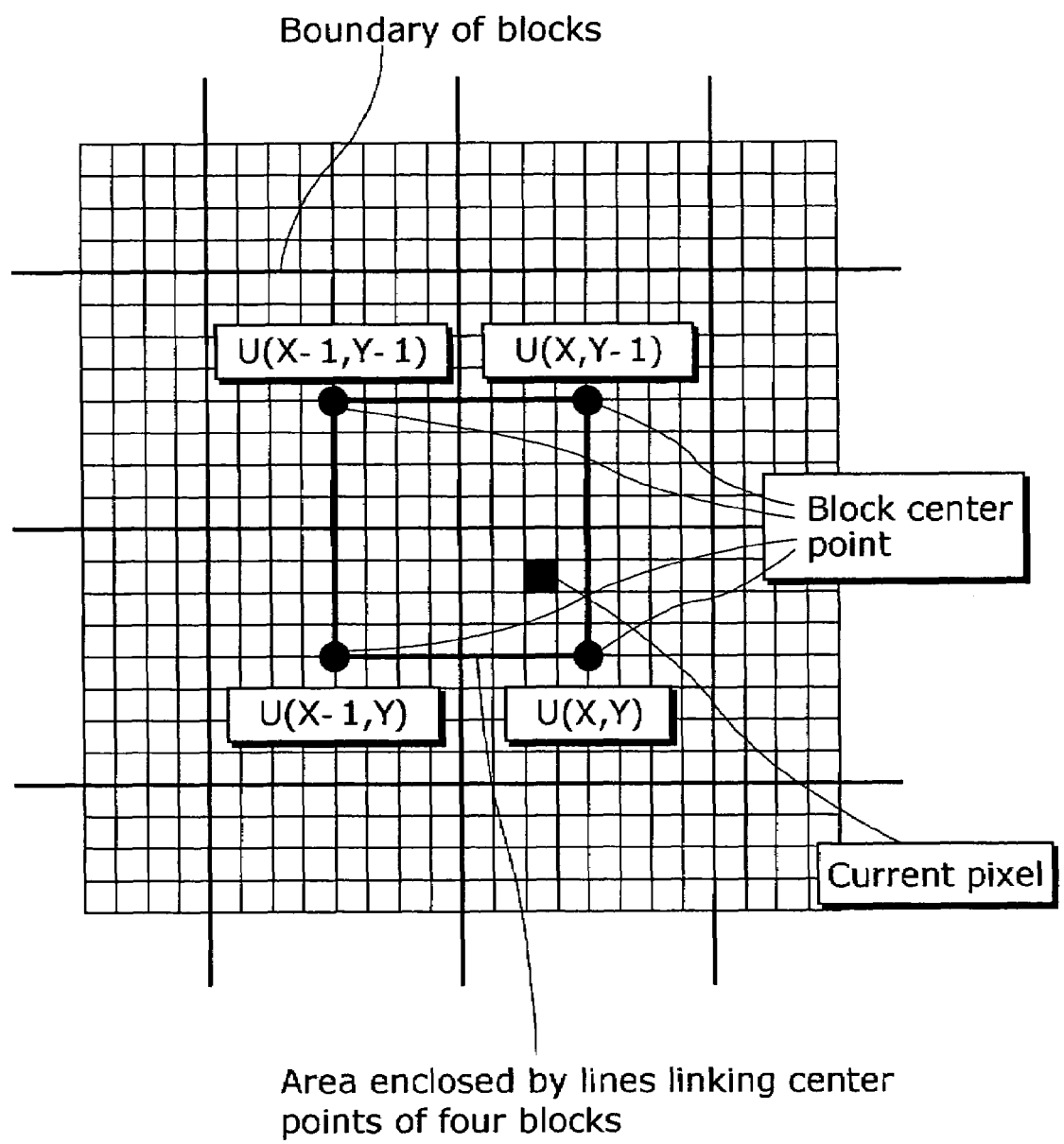
FIG. 13 is an illustration of the interpolation processing of the distribution coefficients.

This interpolation method will be explained with reference to FIG. 13.

First, it is hypothesized that the calculated distribution coefficient U (X, Y) calculated by the distribution coefficient calculation unit 12 is the distribution coefficient at the center point of the respective blocks.

Next, when linking these center points of the four adjacent blocks using four straight lines, the respective pixels in the decoded image are contained in either one of square areas that are boxed using four center points of four blocks. Here, supposing that the distribution coefficient at these four center points of four blocks that encloses a current pixel (x, y) are U (X, Y), U (X−1, Y), U (X, Y−1) and U (X−1, Y−1) respectively, the interpolation distribution coefficient u (x, y) to the current pixel (x, y) can be calculated by performing linear interpolation on these four distribution coefficients according to the distances from the respective center points to the current pixel (x, y).

When finishing the calculation of all the interpolation distribution coefficients u (x, y) (S33), the filter coefficient calculation unit 23 repeatedly executes the following processing as to the respective peripheral pixels (S19). The filter coefficient calculation unit 23 calculates the filter coefficients $\beta_{x, y}$ (i, j) as to peripheral pixels based on the differential values $v_{x, y}$ (i, j) calculated by the differential value calculation unit 11 and interpolation distribution coefficients u (x, y) calculated by the distribution coefficient interpolation unit 22 (S20). More specifically, filter coefficients $\beta_{x, y}$ (i, j) are calculated using the formula where the distribution coefficients U (X, Y) in formula (8) are replaced by the interpolation distribution coefficients u (x, y) calculated to the positions of the respective current pixels.

When finishing the calculation of all the filter coefficients $\beta_{x, y}$ (i, j) (S21), the filter processing unit 24 repeatedly executes the following processing as to the respective current pixels (S22). The filter processing unit 24 performs filter processing on the respective current pixels using the filter coefficients $\beta_{x, y}$ (i, j) on the respective peripheral pixels calculated by the filter coefficient calculation unit 23 and calculates the pixel values of the respective current pixels after filter processing (S23). When finishing the calculation of the pixel values after filter processing as to the respective current pixels in all the blocks (S24) by repeatedly executing this processing (S23), a reconstructed image is generated and the reconstructed image generation processing is finished.

In the case where the image processing apparatus 2 in this second embodiment is used, not only it is possible to obtain the same effect as in the case of the image processing apparatus 1, but also it is possible to realize filter processing where the degree of smoothing changes gradually without allowing the degree of smoothing to become not gradual around the boarder of blocks because filter coefficients are calculated using the gradually changing interpolation distribution coefficients u (x, y) of the respective pixels that are calculated by interpolating the distribution coefficient U (X, Y).

Third Embodiment

Figure 14:
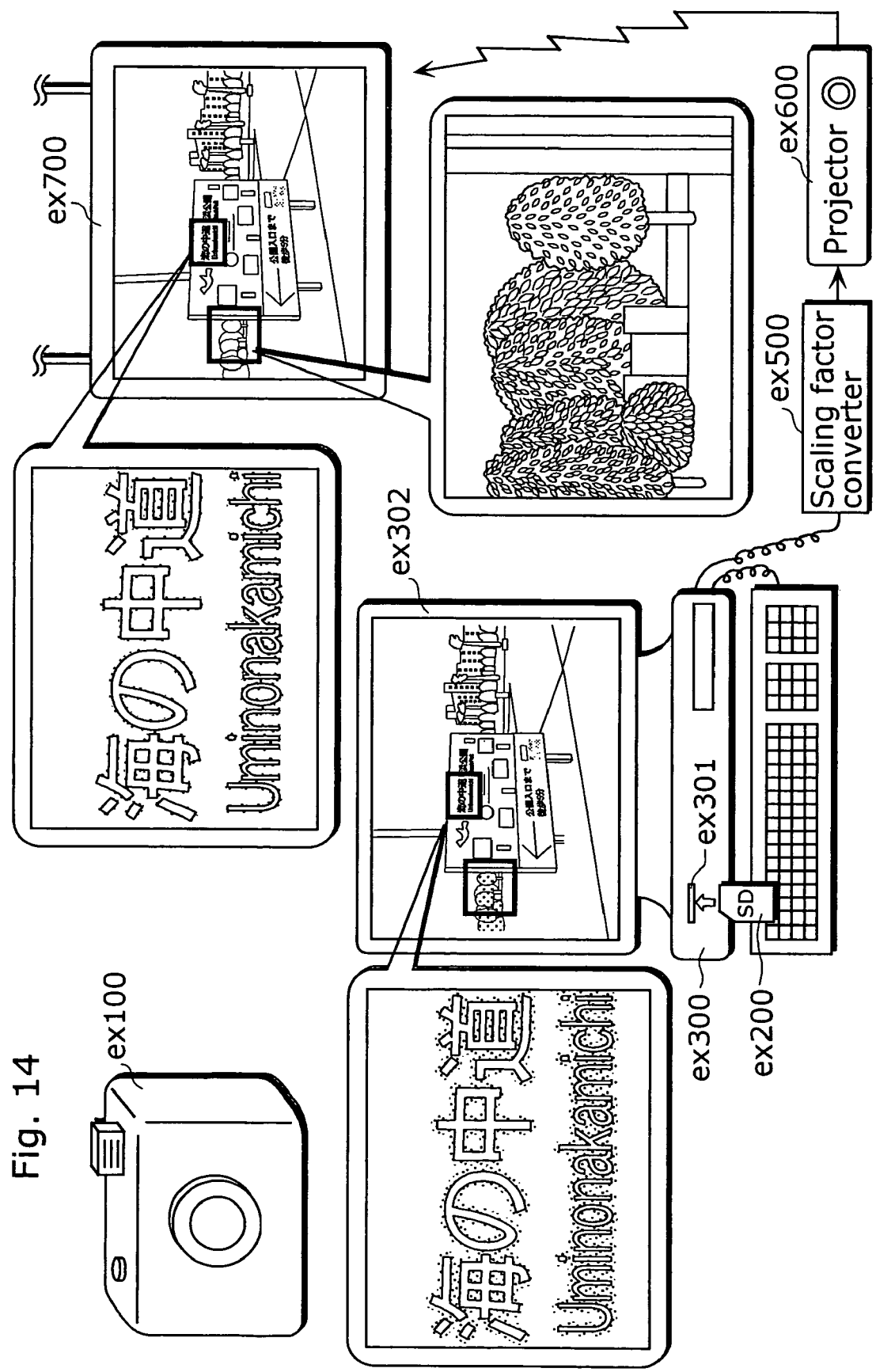
FIG. 14 is a diagram showing the external view of a digital camera, a personal computer, a scaling factor converter, and a projector.

FIG. 14 is a diagram showing the external view of a digital camera, a scaling factor converter and a projector. Note that explanations for the digital camera ex100 and the SD card ex200 are omitted because they are the same as the case of FIG. 7.

The PCex300 comprises a card reader ex301 for setting an SD card ex200, the above-mentioned image decoding apparatus 70, a display ex302, and it reads out the JPEG-compressed data that is specified by a user from the SD card ex200, decodes the data using the decoding device 70 and generates a decoded image in RGB color. After that, the PCex300 displays the generated decoded image on the display ex302 or outputs it to the scaling factor converter ex500. Note that the decoded image displayed on the display ex302 includes mosquito noises that occurred around edges.

The scaling factor converter ex500 performs a size adjustment on a decoded image in RGB color that is outputted from PCex300 and outputs the decoded image in RGB color after a size adjustment. Note that thinning-out processing or interpolation processing is performed if necessary when scaling down or up the decoded image.

The projector ex600 comprises a pre-processing unit, an image processing apparatus, a post-processing unit, a display engine and the like.

The pre-processing unit transforms the decoded image in RGB color after size adjustment that is outputted from the scaling factor converter ex400 into a decoded image of YCbCr data.

The image processing apparatus generates a reconstructed image after eliminating mosquito noises, keeping edges and textures sharp by performing filter processing on the Y component of the decoded image of YCbCr data outputted by the preprocessing unit, further, avoiding remaining mosquito noises around dull edges or excessive changes in image quality depending on the existence of an edge.

The post-processing unit transforms the data into a reconstructed image in RGB color based on the Y component that has already been filter processed by the image processing apparatus and CbCr data in the original image.

The display engine reproduces the reconstructed image in RGB color adjusting its focus on the screen ex700. Here, in the reconstructed image that is generated by the image processing apparatus, mosquito noises are eliminated keeping edges and textures sharp and avoiding excessive changes in image quality depending on the existence of an edge. Therefore, in the reconstructed image that is reproduced on the screen ex700, as shown in FIG. 14, it is possible to eliminate mosquito noises irrespective of the degree of edge strength keeping edges and textures sharp and avoiding excessive changes in image quality depending on the existence of an edge.

Next, the image processing apparatus that is implemented in the projector ex600 will be explained.

Figure 15:
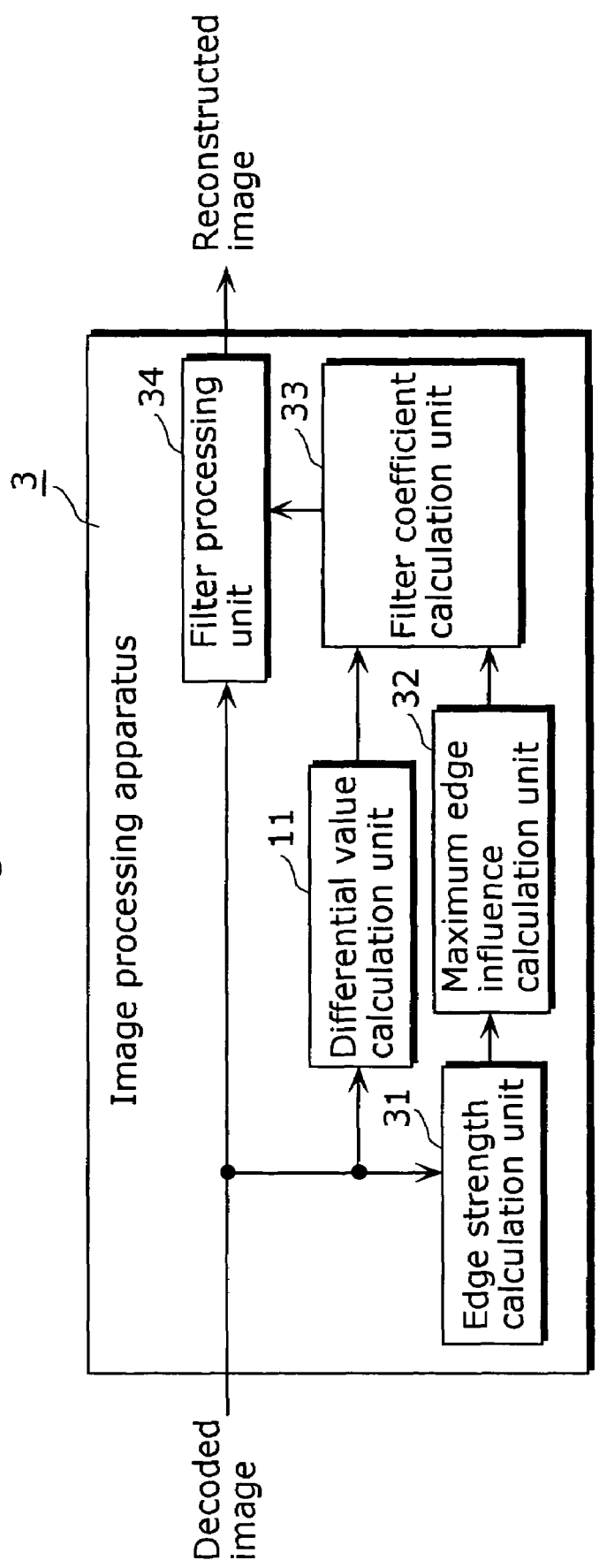
FIG. 15 is a block diagram showing the functional structure of the image processing apparatus that is implemented in projector ex600 shown in FIG. 14.

FIG. 15 is a block diagram showing the functional structure of the image processing apparatus that is implemented in the projector ex600 shown in FIG. 14.

The image processing apparatus 3 generates a reconstructed image by performing filter processing on the Y component that comprise a decoded image respectively for the predetermined filter processing area, and it comprises a differential value calculation unit 11, an edge strength calculation unit 31, a maximum edge influence calculation unit 32, a filter coefficient calculation unit 33 and a filter processing unit 34 as shown in FIG. 15. Note that respective units that correspond to the units in the image processing apparatus 1 and 2 are given the same reference number, and explanations for these units are omitted.

By the way, in the image processing apparatus 1, filter coefficients are calculated using the same distribution coefficients U (X, Y) in the respective blocks. Also, in the image processing apparatus 2, filter processing where the degree of smoothing changes gradually also around the boundary of blocks is realized by interpolating the distribution coefficients U (X, Y) that are calculated block by block, calculating interpolation filter coefficients u (x, y) that change gradually pixel by pixel, and calculating the filter coefficients using these values. However, when the decoded image is scaled up or down as mentioned above, a correct filter processing cannot be performed because it is impossible to know where the boundary of blocks existed originally. Therefore, this image processing apparatus 3 is formed so that it can perform a correct filter processing without reference to the boundary of blocks for the case where it is unknown.

The edge strength calculation unit 31 in the image processing apparatus 3, which is composed of, for example, the Sobel filter (that is explained in the pages 550~564 in "Handbook of Image Analysis" supervised by Mikio Takagi and Haruhisa Shimoda, published by Publishing Circle of Tokyo University in 1991), calculates the edge strength of the respective peripheral pixels in the edge influence calculation area (for example, 11×11 pixels) making a current pixel at center and detects what the edge strength of the respective peripheral pixels are.

The maximum edge influence calculation unit 32 calculates the edge influence on the respective peripheral pixels based on the edge strength of the peripheral pixels in the edge influence calculation area and the distances between the current pixel and the peripheral pixels. After that, the maximum edge influence calculation unit 32 determines the maximum value of the edge influences as to all the peripheral pixels as a distribution coefficient that is used in this filter processing area.

The filter coefficient calculation unit 33 calculates filter coefficients of the respective peripheral pixels in the filter processing area based on the differential value between the pixel values of the peripheral pixels and the pixel value of the current pixel in the filter processing area that is calculated in the differential value calculation unit 11, and also based on the distribution coefficient to be used in the filter processing area calculated by the maximum edge influence calculation unit 32.

The filter processing unit 34 performs filter processing on the current pixel using the filter coefficients $\beta_{x,y}$ (i, j) to the respective peripheral pixels calculated by the filter coefficient calculation unit 33 and calculates the pixel value of the current pixel after filter processing. In this way, the filter processing unit 34 performs strong smoothing when a sharp edge exists near the current pixel, while it performs weak smoothing when an edge exists distant from the current pixel. In other words, the filter processing unit 34 changes a filter coefficient based on the edge strength of the peripheral pixels and the distance from a current pixel dynamically.

Note that the differential value calculation unit 11, the edge strength calculation unit 31, the maximum edge influence calculation unit 32, the filter coefficient calculation unit 33, and the filter processing unit 34 that are make up the above-mentioned image processing apparatus 3 are composed of a CPU, a ROM that prestores an image processing program and a RAM that provides a work area and the like for executing the image processing program like in the cases of image processing apparatus 1 and 2.

Next, the operation when a reconstructed image is generated from a decoded image in the image processing apparatus 3 that is formed as mentioned above will be explained.

Figure 16:
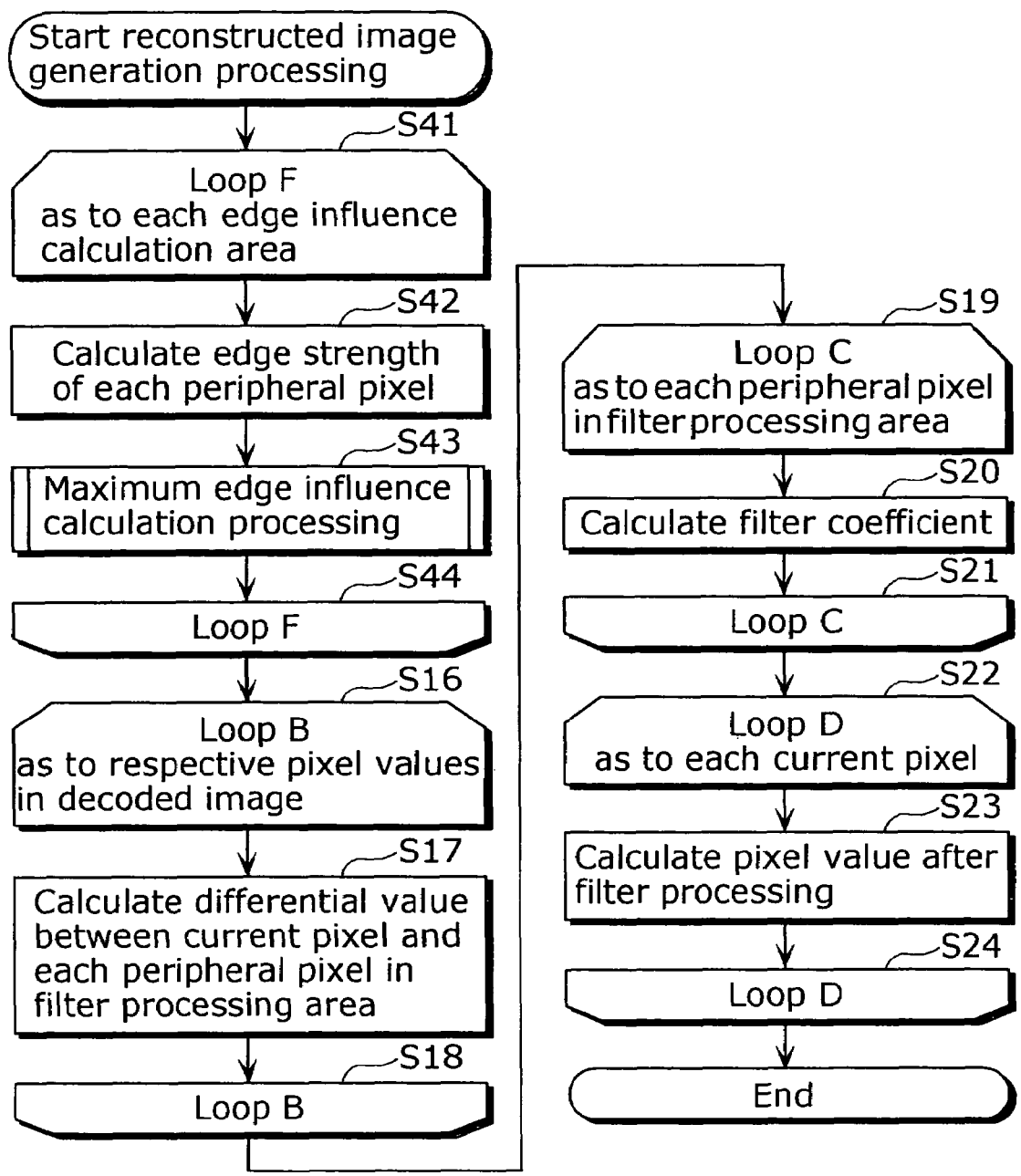
FIG. 16 is a flow chart showing the operation when the image processing apparatus 3 generates a reconstructed image from a decoded image.

FIG. 16 is a flow chart showing the operation when generating a reconstructed image from a decoded image in the image processing apparatus 3.

Figure 17:
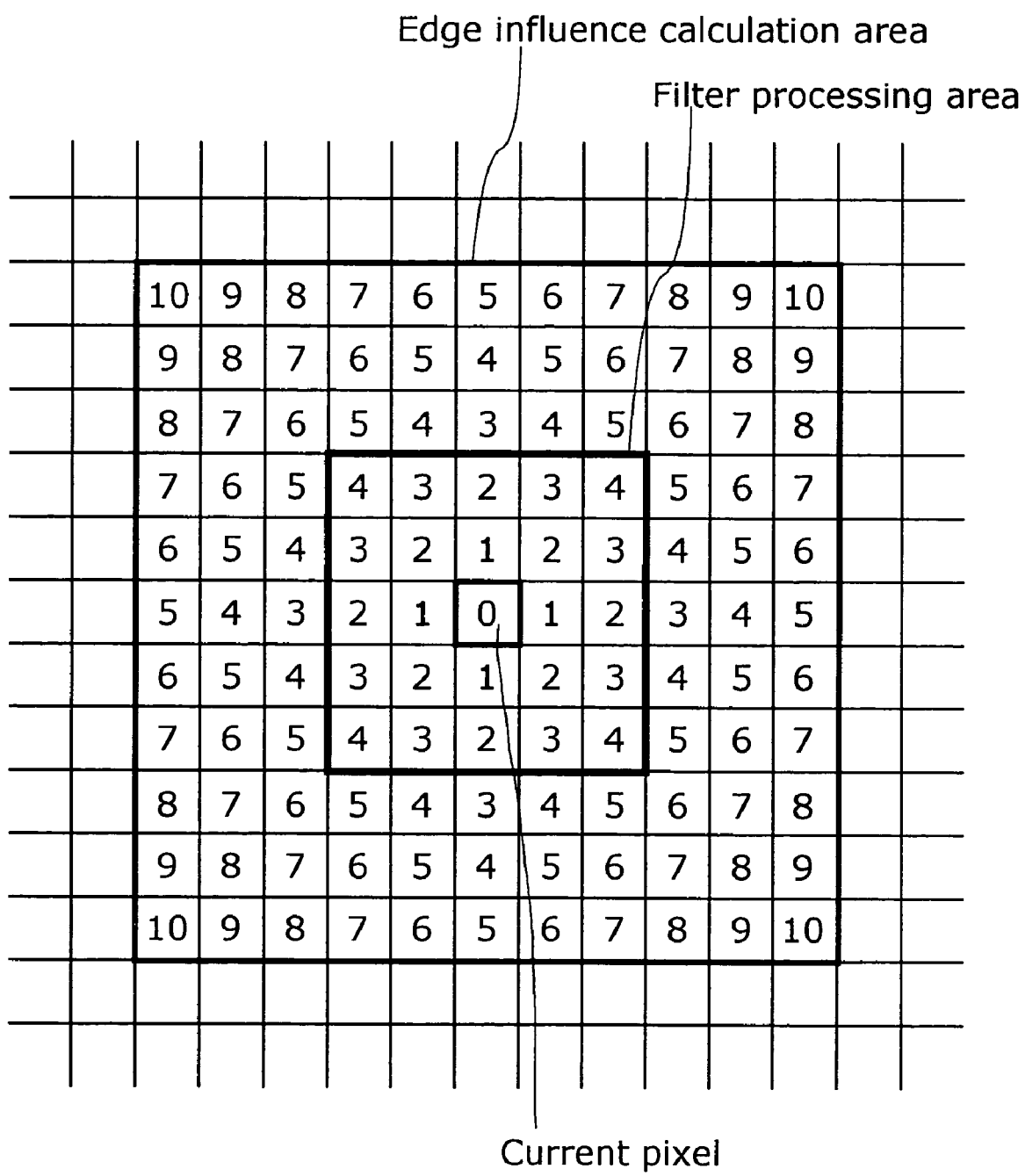
FIG. 17 is a diagram showing the structures of the filter processing area that is set for a pixel (current pixel) and the edge influence calculation area.

The image processing apparatus 3 repeatedly executes the following processing in the respective edge influence calculation areas shown in FIG. 17 (S41).

FIG. 17 is a diagram showing the structure of the edge influence calculation area that is determined for a pixel (a current pixel).

The filter processing area is determined to be 11×11 pixels in this third embodiment here, but various kinds of sizes of filter processing areas such as 21×21 pixels may be determined in response to the size transformation scaling factor of a decoded image.

First, the edge strength calculation unit 31 calculates the edge strength of the respective peripheral pixels respectively using the Sobel filter (S42).

Figures 18A, 18B:
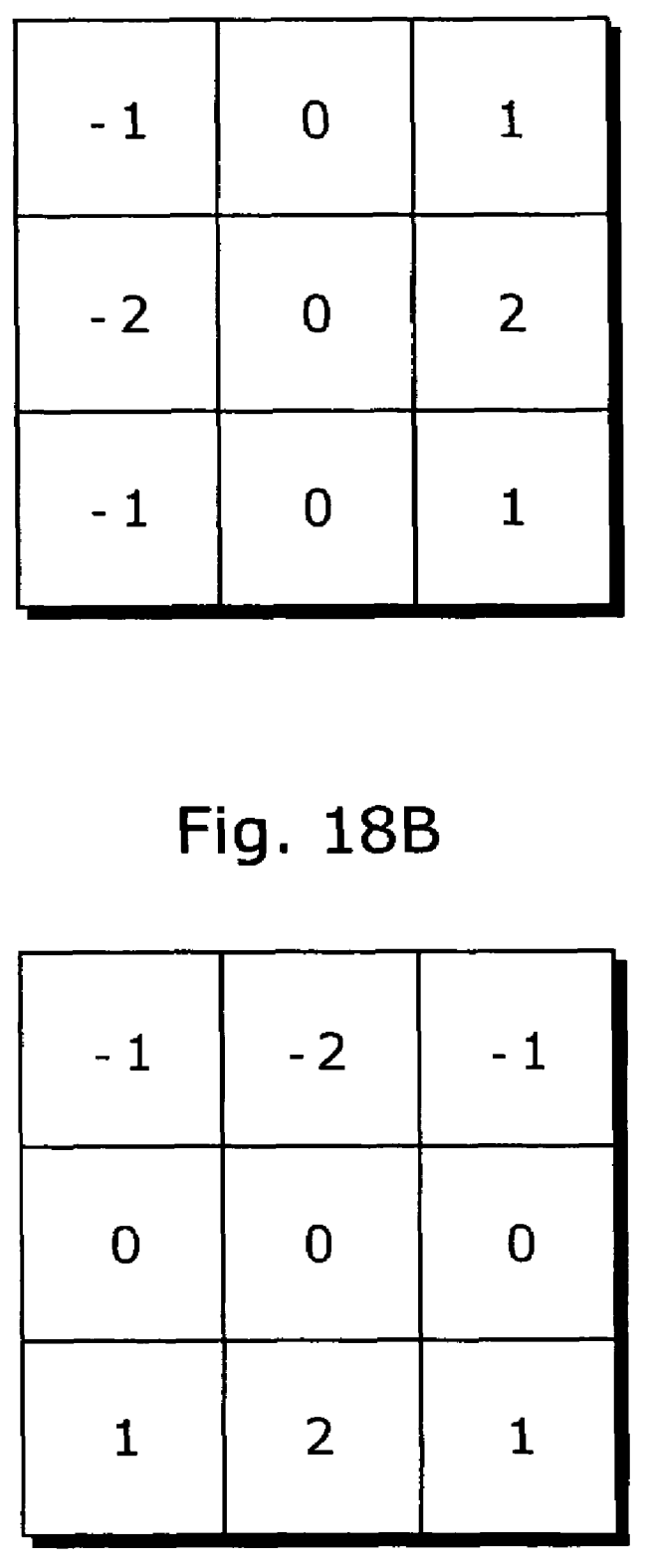

FIG. 18 is a diagram showing the structure of the Sobel filter. Especially, FIG. 18A is a diagram showing the structure of the Sobel filter that is applied horizontally, and FIG. 18B is a diagram showing the structure of the Sobel filter that is applied vertically.

The Sobel filter multiplies the coefficients of Sobel filter shown in FIG. 18 respectively to the pixel value of a current pixel (that is a peripheral pixel here) and the eight pixel values that are placed surrounding the current pixel and adds the multiplied results. When the total value in the horizontal direction is gHS and the total value in the vertical direction is gVS, the edge strength g of the current pixel is obtainable using the following formula.

$$g = (gHS^2 + gVS^2)^{1/2}$$

It is possible to detect what the edge strength of the respective peripheral pixels is by performing this processing on the respective peripheral pixels.

Note that the Sobel filter is used as the edge strength calculation unit 31 in this third embodiment, but edge strength may be obtained using the first differentiating filter such as the Prewitt filter or the second differentiating filter.

When finishing the calculation of the edge strength of the peripheral pixels, the maximum edge influence calculation unit 32 executes the maximum edge influence calculation processing for obtaining the distribution coefficient that is applied for the filter processing area (S43).

Figure 19:
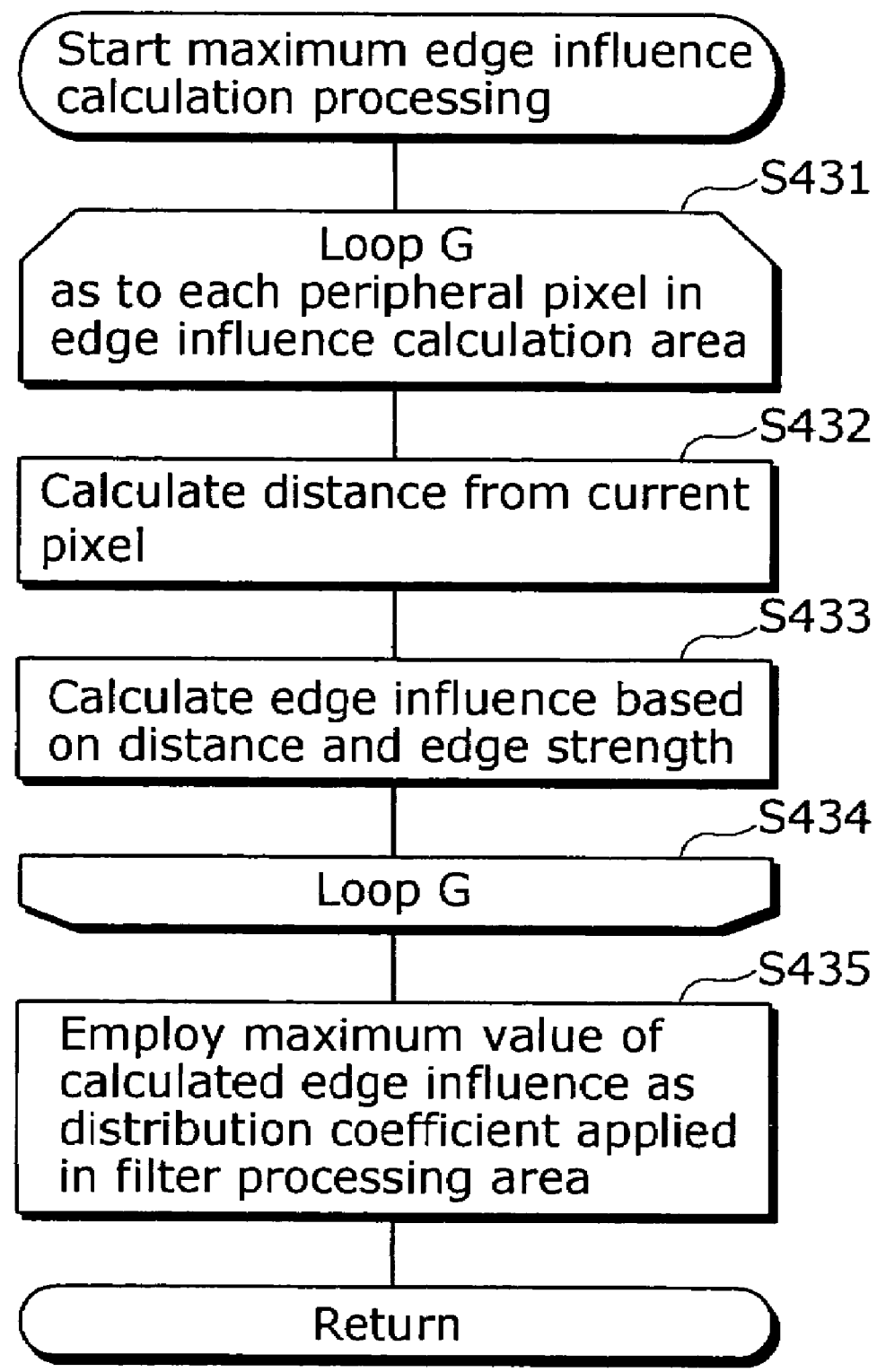
FIG. 19 is a flow chart showing the subroutine of the maximum edge influence calculation processing.

FIG. 19 is a flow chart showing the subroutine of the maximum edge influence calculation processing.

The maximum edge influence calculation unit 32 repeatedly executes the following processing on the respective peripheral pixels in the edge influence calculation area (S431).

First, the maximum edge influence calculation unit 32 calculates the distances from the current pixel as to the respective pixels in the edge influence calculation area (S432). The distances that are obtained in this way are shown in FIG. 17 in a form of numbers. Note that these distances from the current pixel to the peripheral pixels in a slanting direction are roughly calculated using the added values of the distances in the horizontal direction and the distances in the vertical direction in this third embodiment, but it is possible to practically calculate using a square root of the added value of a square of the distance in the horizontal direction and a square of the distance in the vertical direction.

Figure 20:
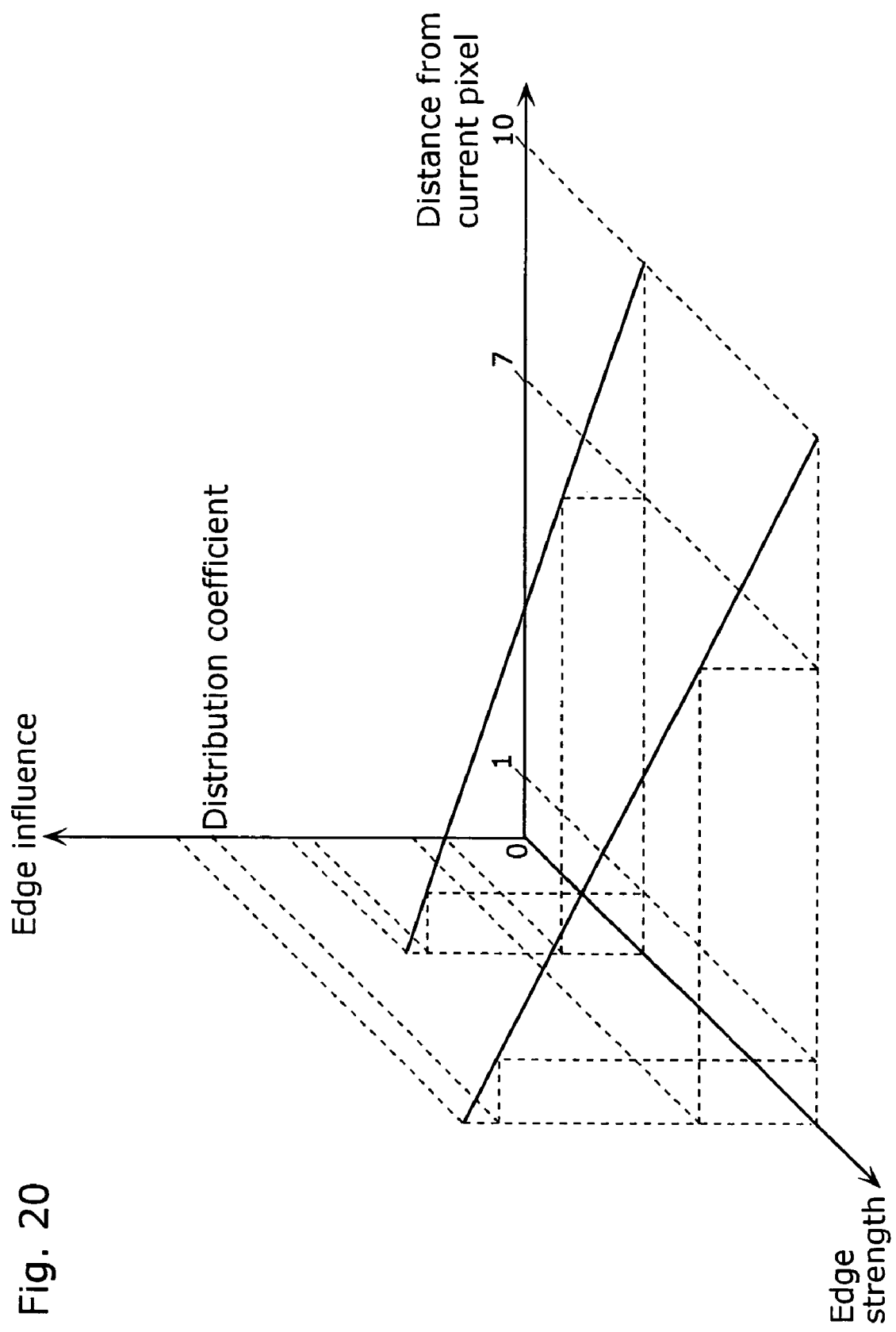
FIG. 20 is a diagram showing the relation between the distance from the current pixel, the edge strength, and the edge influence.

After obtaining the distances, the maximum edge influence calculation unit 32 calculates the edge influence (S433) based on the distances from the current pixel obtained in the step S432 and the edge strength of the peripheral pixels that are calculated by the edge strength calculation unit 31. Here, the edge influence is shown using the function F (distance, edge strength) based on the distances from the current pixel and the edge strength as shown in FIG. 20. The closer to the current pixel the peripheral pixel is and the bigger the edge strength is, the bigger the edge influence is, that is, the farther from the current pixel the peripheral pixel is and the smaller the edge strength is, the smaller the edge influence is.

When the edge influence is obtained as to the peripheral pixels in the filter processing area by repeatedly executing this processing (S434), the maximum edge influence calculation unit 32 employs the maximum value out of the calculated edge influence as the distribution coefficient that is applied in the filter processing area (S435) and returns to the main routine shown in FIG. 16.

When finishing the calculation of the distribution coefficients that are applied in the respective filter processing areas (S44), the differential value calculation unit 11 repeatedly executes the following processing (S16) as to the respective pixels in the decoded image. The differential value calculation unit 11 respectively calculates the differential values $\upsilon_{x,y}$ (i, j) between the pixel value f (x, y) of a current pixel and the pixel values f (x+i, y+j) of the respective peripheral pixels in the filter processing area (all the peripheral pixels included in the filter processing area shown in FIG. 10) (S17).

When finishing the calculation of all the differential values $\upsilon_{x,y}$ (i, j) (S58), the filter coefficient calculation unit 33 repeatedly executes the following processing as to the peripheral pixels in the filter processing area (S19). The filter coefficient calculation unit 33 calculates the filter coefficients $\beta_{x,y}$ (i, j) as to the respective peripheral pixels based on the differential values $\upsilon_{x,y}$ (i, j) calculated by the differential value calculation unit 11 and the distribution coefficients U (X, Y) calculated by the maximum edge influence calculation unit 32 (520). More specifically, the filter coefficients $\beta_{x,y}$ (i, j) are calculated using the calculation formula where the distribution coefficient U (X,Y) in the formula (8) is replaced by the distribution coefficient U (X,Y) calculated by the maximum edge influence calculation unit 32.

When finishing the calculation of all the filter coefficients $\beta_{x,y}$ (i, j) (S21), the filter processing unit 34 repeatedly executes the following processing as to the respective current pixels (S22). The filter processing unit 34 performs filter processing on the current pixel using the filter coefficients $\beta_{x,y}$ (i, j) on the respective peripheral pixels calculated by the filter coefficient calculation unit 33 and calculates the pixel value of the current pixel after filter processing (523). When finishing the calculation of the pixel values after filter processing as to the respective pixel values in all the blocks (S24) by repeatedly executing this processing (S23), a reconstructed image is generated and the reconstructed image generation processing is finished.

As mentioned up to this point, the image processing apparatus 3 concerning the third embodiment calculates the edge strength of the peripheral pixels in the edge influence calculation area by the edge strength calculation unit 31, determines the distribution coefficient (the maximum value of the edge influence) to be applied for the filter processing area according to the distance from the edge pixel and the degree of the edge strength by the maximum edge influence calculation unit 32, calculate the filter coefficient according to the distribution coefficient by the filter coefficient calculation unit 33, and changes the degree of the smoothing on pixels by the filter processing unit 34.

Therefore, it is possible to perform filter processing effectively even when the position of the boundary of blocks is unknown. Further, it is possible to keep textures sharp like shown conventionally even in the case where there coexist a natural image and an artificial image, and thus it is possible to keep edges sharp and eliminate mosquito noises completely irrespective of the degree of edge strength. Also, it is possible to surely prevent the situation where the image quality varies sharply between the two divided blocks of the blocks to be filter processed like in conventional processing and the blocks not to be filter processed because filter processing is performed without reference to the boundary of blocks.

Note that the value after subtracting the minimum pixel value min {f (x, y)} from the maximum pixel value max {f (x, y)} in the block is considered as the distribution coefficient U (X, Y) that is applied in the block in the cases of image processing apparatus 1 and 2 in the above-mentioned embodiments 1 and 2, but the distribution coefficient is not limited to the value after subtraction, that is, the distribution coefficient may be a value showing the distribution of the pixel values in the block. In other words, for example, it is possible to use the variance value from the average pixel value in the block as the distribution coefficient U (X, Y). Also, it is possible to calculate edge strength pixel by pixel using the Sobel filter and use the maximum edge strength in each block as the distribution coefficient U (X, Y).

Also, as to the calculation method of the filter coefficient $\beta_{x,y}$ (i, j) based on the differential value $v_{x,y}$ (i, j) and the distribution coefficient U (X, Y) (or the interpolation distribution coefficients u (x, y)), it is possible to predetermine a plurality of levels concerning the differential value $v_{x,y}$ (i, j) and the distribution coefficient U (X, Y), (or the interpolation distribution coefficients u (x, y)) and set filter coefficients step by step according to the respective levels instead of calculating the filter coefficient $\beta_{x,y}$ (i, j) based on the serial functions shown in formula (6).

Also, when processing a color image, it is possible to calculate the filter coefficient $\beta_{x,y}$ (i, j) from the luminance component (Y) and perform filter processing for the respective components of R, G and B using this filter coefficient $\beta_{x,y}$ (i, j).

Also, the filter processing in the present invention is not limited to the processing shown in formula (5), that is, the filter processing can be realized using another formula in a form of the function that is obtained from a filter coefficient, a differential value, and a distribution coefficient.

Further, the present invention is not limited to the processing for eliminating noises that occurred when using the JPEG, that is, it can be used as the processing for eliminating noises that occurred when using another block coding method.

Also, its use is not limited to still images, that is, it can be applied for moving images like the processing on the MPEG compression data and the same effect as in the case of still images can be obtained in the case of moving images.

Also, the processing is not necessarily performed by a printer or in a projector, that is, it can be performed by a PC.

Also, the printer directly prints data in the above-mentioned embodiments 1 and 2, but the so-called Pull Print method that has been under consideration in these days is also applicable. In the Pull Print method, the JPEG-compressed data is transmitted from a to a printer as it is instead of the data decoded into RGB data in the PC being transmitted to a printer, and then all the processes after the decoding process are performed in the printer. In this case, the positions of the boundaries of blocks are distinguishable as the printer receives the JPEG-compressed data as it is and performs all the processes after the decoding process inside.

The image processing apparatus is applicable for a computer apparatus for generating reconstructed images such as a printer, a projector and the like by performing filter processing on the decoded images that are obtained by decoding the compressed data obtained by coding the multiple-value images by the block of M×N pixels so as to eliminate noises.

What is claimed is:

1. An image processing apparatus for performing filter processing on a decoded image that is obtained by decoding compressed data obtained by coding a multi-valued image in blocks of M×N pixels so as to eliminate noises, and generating a reconstructed image, the image processing apparatus comprising:

a differential value calculation unit operable to calculate a differential value between a pixel value of a current pixel and each one of pixel values of peripheral pixels in a filter processing area that is predetermined for each pixel that forms the decoded image, a distribution coefficient calculation unit operable to calculate distribution coefficients as to the pixel values of the pixels, a filter coefficient calculation unit operable to calculate filter coefficients for each of the peripheral pixels based on the differential values calculated by the differential value calculation unit and the distribution coefficients calculated by the distribution coefficient calculation unit such that the filter coefficient for the peripheral pixel is smaller when the differential value between the pixel value of the current pixel and the pixel value of the peripheral pixel is larger, and such that the filter coefficient for the peripheral pixel is larger when the differential value between the pixel value of the current pixel and the pixel value of the peripheral pixel is smaller, and a filter processing unit operable to perform filter processing as to the pixel value of the current pixel in the decoded image using the filter coefficient calculated by the filter coefficient calculation unit and calculate the pixel value of the current pixel in the reconstructed image.

2. The image processing apparatus according to claim 1, wherein the distribution coefficient calculation unit calculates the distribution coefficients of the pixel values of the respective pixels in blocks of M×N pixels.

3. The image processing apparatus according to claim 2, wherein the distribution coefficient calculation unit calculates the differential value by subtracting a minimum value from a maximum value of pixel values in the block as a distribution coefficient of pixel values of the current block.

4. The image processing apparatus according to claim 2, wherein the distribution coefficient calculation unit calculates a variance value from an average pixel value in the block as a distribution coefficient of pixel values of the current block.

5. The image processing apparatus according to claim 2, wherein the distribution coefficient calculation unit calculates maximum edge strength in the block as a distribution coefficient of pixel values of the current block.

6. The image processing apparatus according to claim 1, wherein the distribution coefficient calculation unit calculates distribution coefficients of pixel values in blocks of M×N pixels, calculates interpolation distribution coefficients as to pixel values of the respective pixels by interpolating the calculated distribution coefficients of pixel values in the block and distribution coefficients of pixel values in neighboring blocks of the current block, and uses the calculated interpolation distribution coefficients as distribution coefficients as to pixel values of the respective pixels.

7. The image processing apparatus according to claim 6, wherein the distribution coefficient calculation unit calculates a differential value by subtracting a minimum value from a maximum value of a pixel value in the block as a distribution coefficient of pixel values of the current block.

8. The image processing apparatus according to claim 6, wherein the distribution coefficient calculation unit calculates a variance value from an average pixel value in the block as a distribution coefficient of pixel values of the current block.

9. The image processing apparatus according to claim 6, wherein the distribution coefficient calculation unit calculates a maximum edge strength in the block as a distribution coefficient of pixel values of the current block.

10. The image processing apparatus according to claim 1, wherein the distribution coefficient calculation unit includes:

an edge strength calculation unit operable to calculate edge strength of the peripheral pixels in a predetermined edge influence calculation area, and a maximum edge influence calculation unit operable to calculate edge influence as to a current pixel based on edge strength of the peripheral pixels calculated by the edge strength calculation unit and distances between the current pixel and the peripheral pixels, and calculate the maximum value of a calculated edge influence as a distribution coefficient of pixel values of the respective pixels in the filter processing area.

11. An image processing method for generating a reconstructed image by performing filter processing on a decoded image that is obtained by decoding compressed data obtained by coding a multi-valued image in blocks of M×N pixels so as to eliminate noises and generating a reconstructed image, the method comprising:

a differential value calculation step of calculating a differential value between a pixel value of a current pixel and each one of pixel values of peripheral pixels in a filter processing area that is predetermined for each pixel that forms the decoded image, a distribution coefficient calculation step of calculating distribution coefficients as to the pixel values of the respective pixels, a filter coefficient calculation step of calculating filter coefficients for each of the peripheral pixels based on the differential values calculated in the differential value calculation step and the distribution coefficients calculated in the distribution coefficient calculation step such that the filter coefficient for the peripheral pixel is smaller when the differential value between the pixel value of the current pixel and the pixel value of the peripheral pixel is larger, and such that the filter coefficient for the peripheral pixel is larger when the differential value between the pixel value of the current pixel and the pixel value of the peripheral pixel is smaller, and a filter processing step of performing filter processing as to the pixel value of the current pixel in the decoded image using the filter coefficient that is calculated in the filter coefficient calculation step and calculating the pixel value of the current pixel in the reconstructed image.

12. A tangible computer-readable storage medium having stored thereon a program for causing a computer execute an image processing method for generating a reconstructed image by performing filter processing on a decoded image that is obtained by decoding compressed data obtained by coding a multi-valued image in blocks of M×N pixels so as to eliminate noises and generating a reconstructed image, the program comprising:

a differential value calculation step of calculating a differential value between a pixel value of a current pixel and each one of pixel values of peripheral pixels in a filter processing area that is predetermined for each pixel that forms the decoded image, a distribution coefficient calculation step of calculating distribution coefficients as to the pixel values of the respective pixels, a filter coefficient calculation step of calculating filter coefficients for each of the peripheral pixels based on the differential values calculated in the differential value calculation step and the distribution coefficients calculated in the distribution coefficient calculation step such that the filter coefficient for the peripheral pixel is smaller when the differential value between the pixel value of the current pixel and the pixel value of the peripheral pixel is larger, and such that the filter coefficient for the peripheral pixel is larger when the differential value between the pixel value of the current pixel and the pixel value of the peripheral pixel is smaller, and a filter processing step of performing filter processing as to the pixel value of the current pixel in the decoded image using the filter coefficient that is calculated in the filter coefficient calculation step and calculating the pixel value of the current pixel in the reconstructed image.

13. The image processing apparatus according to claim 1, wherein:

the distribution coefficient calculation unit calculates, as the distribution coefficient, an edge strength represented by the pixel value of each pixel, and the filter coefficient calculation unit calculates the filter coefficient for each of the plural peripheral pixels so that: the filter coefficient for the peripheral pixel is smaller when the differential value between the pixel value of the current pixel and the pixel value of the peripheral pixel is larger; the filter coefficient for the peripheral pixel is larger when the differential value between the pixel value of the current pixel and the pixel value of the peripheral pixel is smaller; the filter coefficient for the peripheral pixel is larger and a change rate of the filter coefficient for the differential value is smaller when the edge strength calculated by the distribution coefficient calculation unit is larger; and the filter coefficient for the peripheral pixel is smaller and a change rate of the filter coefficient for the differential value is larger when the edge strength calculated by the distribution coefficient calculation unit is smaller.

* * * * *